(12) United States Patent
Tamura et al.

(10) Patent No.: US 7,639,945 B2
(45) Date of Patent: Dec. 29, 2009

(54) OPTICAL SWITCH DEVICE AND OPTICAL SWITCHING METHOD

(75) Inventors: Yuji Tamura, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 373 days.

(21) Appl. No.: 11/346,242

(22) Filed: Feb. 3, 2006

(65) Prior Publication Data
US 2006/0291867 A1 Dec. 28, 2006

(30) Foreign Application Priority Data
Jun. 22, 2005 (JP) ............................. 2005-182424

(51) Int. Cl.
*H04J 14/00* (2006.01)
(52) U.S. Cl. ............................. 398/45; 398/65; 398/152
(58) Field of Classification Search ................... 398/45, 398/46, 49–51, 65, 152
See application file for complete search history.

(56) References Cited

U.S. PATENT DOCUMENTS

| 5,798,853 | A | 8/1998 | Watanabe | |
| 6,307,984 | B1 | 10/2001 | Watanabe | |
| 2003/0043366 | A1 | 3/2003 | Ohta et al. | |
| 2005/0265728 | A1* | 12/2005 | Yao | 398/152 |
| 2006/0045445 | A1* | 3/2006 | Watanabe | 385/122 |
| 2006/0051100 | A1* | 3/2006 | Watanabe | 398/152 |
| 2006/0159463 | A1* | 7/2006 | Futami et al. | 398/152 |

OTHER PUBLICATIONS

Patent Abstracts of Japan, Publication No. 2002-090788, Published Mar. 27, 2002.

* cited by examiner

*Primary Examiner*—Dzung D Tran
(74) *Attorney, Agent, or Firm*—Fujitsu Patent Center

(57) ABSTRACT

In an optical switch device, an optical control pulse is inputted into a nonlinear optical fiber in phase with each optical pulse of signal light which is to be outputted, so that the polarization directions of the optical control pulse and the signal light form a predetermined angle at the input stage of the nonlinear optical fiber, the optical control pulse causes polarization rotation and parametric amplification of the optical pulse in the nonlinear optical fiber, and then the optical pulse is outputted through a polarizer. The excitation level of the optical control pulse is set on the basis of the difference of a monitored output level of the optical pulse from a target level so that the output levels of optical pulses of the signal light are controlled at one or more desired levels.

14 Claims, 21 Drawing Sheets

OPTICAL SWITCH DEVICE AND OPTICAL SWITCHING METHOD

CROSS-REFERENCE TO RELATED APPLICATIONS

This application is based upon and claims the benefits of priority from the prior Japanese Patent Application No. 2005-182424, filed on Jun. 22, 2005, the entire contents of which are incorporated herein by reference.

BACKGROUND OF THE INVENTION

1) Field of the Invention

The present invention relates to an optical switch device and an optical switching method for switching optical signals.

2) Description of the Related Art

With the rapid expansion of the use of the Internet and the increase in the number of massive pieces of content, demands for communication networks having greater capacity and flexibility and realizing higher transmission speed have been increasing. In order to construct such communication networks, the optical communication technology is essential, and development and research of the optical communication are being performed in various fields.

In particular, optical switches which perform on-off control of optical signals will be important constituents of photonic networks in future. In recent years, the ultrafast optical switching technology in which nonlinear optical effects in optical fibers are positively used has been receiving attention. The nonlinear optical effects are phenomena in which the properties of glass vary with the optical intensity of light which propagates through the glass, and the linearity of the optical response is lost when the power of the light is relatively strong.

Typical optical switches which are conventionally used are the MEMS (micro-electro-mechanical system) and the waveguide switch. The MEMS is manufactured by the micro-machine technology, and performs on-off control of optical signals by changing the direction of the optical path with a micron-sized mirror or a shutter. On the other hand, the waveguide switch performs on-off control of optical signals by applying heat or an electric field to an optical waveguide so as to cause a thermo-optic effect or an electro-optic effect and change the refraction index of the optical waveguide.

However, the light-collection efficiency of the MEMS is lowered due to the alignment tolerance, i.e., the tolerance of the alignment of the elements such as mirrors with an optical axis. On the other hand, in the waveguide switch, the insertion loss (the level loss occurring when light is inserted into the waveguide switch) occurs, and the extinction ratio (the ratio of the maximum to the minimum of the intensity of transmitted light) cannot be increased. Therefore, in the waveguide switch, the signal level is likely to be lowered, and noise is likely to occur.

As described above, in the conventional optical switches such as the MEMS and the waveguide switch, the signal quality deteriorates. In addition, the control of the optical switches based on electronic signal processing cannot realize high-speed switching.

On the other hand, the optical switches which utilize physical properties of light and nonlinear optical effects of optical fibers realize high-speed switching by inputting signal light and control light (excitation light) into a highly nonlinear fiber (HNLF), in which a nonlinear optical effect occurs with high efficiency, and causing parametric amplification of nonlinear variations of the refraction index in the HNLF. The parametric amplification is a nonlinear optical effect which amplifies the intensity of signal light, and a phenomenon which is caused by interaction between the signal light and the control light in the HNLF without use of a linear amplification medium such as the conventionally used EDF (erbium-doped fiber). A simple definition of the parametric amplification or the parametric oscillation is a process of generating light waves having two wavelengths $\omega 1$ and $\omega 2$ in a nonlinear optical medium by using a higher frequency $\omega 3$.

The parametric amplification in the HNLF is an optical and physical phenomenon occurring very quickly. Therefore, the response of the parametric amplification is far quicker than the mechanical switching of the optical path or the responses of other phenomena in which the refraction index of a medium is changed by a thermo-optic effect or an electro-optic effect, so that it is possible to realize high-speed switching at a speed corresponding to the input rate of ultrafast optical pulses into the HNLF, and extract each optical pulse of interest from among the ultrafast optical pulses. At this time, the optical pulses are amplified before being outputted.

As described above, the optical switches using the highly nonlinear fiber (HNLF) have the function of the high-speed switching and the function of optical amplification. Therefore, such optical switches exhibit high switching efficiency, and can realize high-quality optical switching and transmission in which noise is extremely low and deterioration of the SNR (signal-to-noise ratio) is little. Thus, there is great expectation that the above optical switching by use of the highly nonlinear fiber (HNLF) becomes a technique for realizing ultrafast optical-signal processing in the next generation.

A conventional technique using the parametric amplification is disclosed in Japanese Unexamined Patent Publication No. 2002-90788, paragraph Nos. 0013 to 0020 and FIG. 1. According to this technique, a parametric amplifier using an optical fiber and having amplification characteristics which are independent of the polarization of an inputted optical signal is used.

In the case where a desired optical pulse extracted from time-division-multiplexed (TDM) signal light is switched and outputted from an optical switch which uses parametric amplification occurring in a highly nonlinear fiber (HNLF), an optical control pulse is inputted into the HNLF in such a manner that the optical control pulse is in phase with the optical pulse to be switched, and the polarization direction of the optical control pulse makes a certain angle with the polarization direction of the optical pulse.

FIG. 20 is a diagram illustrating an outline of operations of optical switching by use of the parametric amplification. Signal light and control light are inputted into a highly nonlinear fiber F, where the signal light is a time-division multiplexed (TDM) optical signal in which optical pulses of the signal light in the channels ch1 to ch4 are time-division multiplexed.

In the case where only the optical pulses of the signal light in the channels ch1 and ch3 are to be extracted, switched, and outputted, optical control pulses p1 and p3 are inputted into the highly nonlinear fiber F in such a manner that the optical control pulses p1 and p3 are in phase with the optical pulses of the signal light in the channels ch1 and ch3, respectively, and the polarization directions of the optical control pulses p1 and p3 make a certain angle with the polarization directions of the optical pulses of the signal light in the channels ch1 and ch3, respectively. Then, the power of the optical control pulses p1 and p3 is respectively transferred to the optical pulses of the signal light in the channels ch1 and ch3 by the parametric amplification occurring in the highly nonlinear fiber F, so that only the optical pulses of the signal light in the channels ch1 and ch3 are amplified and outputted from the highly nonlinear fiber F. Although not shown, in practice, unnecessary optical signals are cut off by using a polarizer, a band-pass filter, and the like which is arranged at the output stage of the highly nonlinear fiber F.

As explained above, it is possible to perform switching by generating an optical control pulse for each of a plurality of channels time-division multiplexed in signal light, and inputting one or more of the optical control pulses corresponding to one or more of optical pulses to be switched, in the above-mentioned manner.

However, the optical pulses time-division multiplexed in the respective channels may be transmitted to the optical switch from various nodes distributed over a network. Therefore, in practice, the optical levels in the different channels may be different.

Conventionally, optical control pulses having identical levels which are preset are inputted into the highly nonlinear fiber F for switching of optical pulses of the signal light in a plurality of channels constituting signal light and having different levels. Therefore, the levels of the optical pulses after the switching become different, so that it is necessary to compensate for the differences among the levels.

FIG. 21 is a diagram provided for explaining the problems in the conventional optical switching. In FIG. 21, the signal light is a time-division multiplexed (TDM) optical signal in which optical pulses in the channels ch1 to ch4 are time-division multiplexed, the levels of the optical signals in the channels ch1 to ch4 are different. However, the levels of optical control pulses for the optical signals in the channels ch1 to ch4 are identical.

In the case where the levels of all the optical control pulses p1 to p4 for the different channels of the signal light are fixed, when the optical control pulses p1 to p4 are inputted into the highly nonlinear fiber F in the aforementioned manner, the relative level differences among the optical signals in the channels ch1 to ch4 at the output stage of the highly nonlinear fiber F correspond to the relative level differences among the optical signals in the channels ch1 to ch4 at the input stage of the highly nonlinear fiber F. That is, the switch-output levels of the optical signals in the channels ch1 to ch4 become different. Therefore, it is necessary to compensate for the differences among the optical levels at each receiver node, so that the convenience in system operation is deteriorated. In addition, in order to compensate for the differences among the levels of the optical signals in the channels ch1 to ch4, it is possible to arrange an optical amplifier for each channel, and bring the levels of the optical signals in each channel to a constant level by amplification at a stage following the highly nonlinear fiber F.

However, with the rapid increase in the communication traffic in recent years, the numbers of channels to be used have been increasing. In addition, the numbers of channels of time-division multiplexed optical pulses of the signal light in the currently used systems are very large. If, in such circumstances, the above optical amplifier for compensation for the differences among the optical levels is provided for every channel at each node in a network in which optical switching is performed, the equipment size and cost increase, and the increase in the equipment size and cost greatly impedes economical construction of an ultrafast optical communication network.

SUMMARY OF THE INVENTION

The present invention is made in view of the above problems, and a first object of the present invention is to provide an optical switch device which adaptively controls the switch-output levels of time-division multiplexed optical pulses, and performs high-quality, flexible optical switching of the time-division multiplexed optical pulses.

In addition, a second object of the present invention is to provide an optical switching method which adaptively controls the switch-output levels of time-division multiplexed optical pulses, and performs high-quality, flexible optical switching of the time-division multiplexed optical pulses.

In order to accomplish the above first object, an optical switch device for switching optical signals is provided. The optical switch device comprises: a nonlinear optical fiber which exhibits a nonlinear optical effect, and receives signal light having a first wavelength and being constituted by optical pulses time-division multiplexed in a plurality of channels; a first polarization controller which controls a polarization direction of the signal light; a polarizer which is arranged on an output side of the nonlinear optical fiber, and has a major polarization axis perpendicular to the polarization direction of the signal light controlled by the first polarization controller; a level monitoring unit which monitors levels of the optical pulses when the optical pulses are outputted from the polarizer, compares each of the monitored levels with a target level, and calculates a difference of the monitored level from the target level; and a control-light setting unit which includes a control-light generation unit and a second polarization controller, and causes polarization rotation and parametric amplification in the nonlinear optical fiber so as to realize optical switching of the optical pulses and control the levels of the optical pulses at one or more desired levels when the optical pulses are outputted from the polarizer, by using the control-light generation unit and the second polarization controller and inputting one of optical control pulses into the nonlinear optical fiber in phase with each of the optical pulses when the optical pulse is to be outputted from the optical switch device, in such a manner that the one of the optical control pulses has a polarization direction forming a predetermined angle with the polarization direction of the signal light controlled by the first polarization controller, where the control-light generation unit generates the optical control pulses, the optical control pulses have a second wavelength different from the first wavelength, and excitation levels which are variably set so as to bring the differences close to zero, and the second polarization controller sets polarization directions of the optical control pulses so as to form the predetermined angle with the polarization direction of the signal light controlled by the first polarization controller.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Embodiments of the present invention are explained in detail below with reference to drawings.

Optical Switch Device

Figure 1:
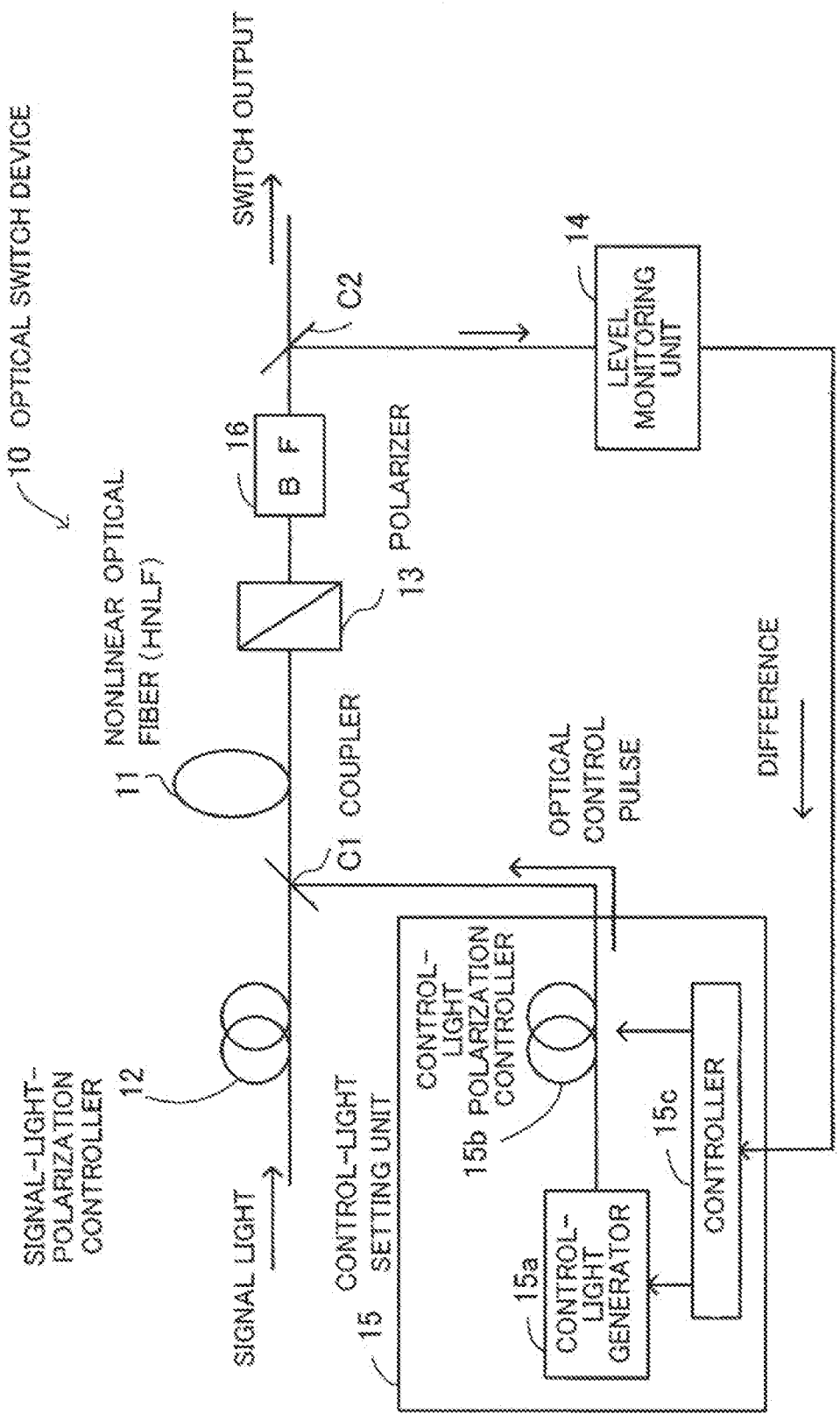
FIG. 1 is a diagram illustrating the principle of the optical switch device according to the present invention.

FIG. 1 is a diagram illustrating the principle of the optical switch device according to the present invention. The optical switch device 10 is a device which performs switching of optical pulses for transmission, and comprises a nonlinear optical fiber 11, a signal-light-polarization controller 12, a polarizer 13, a level monitoring unit 14, a control-light setting unit 15, a filter 16, and couplers C1 and C2.

The nonlinear optical fiber 11 exhibits a nonlinear optical effect, and (TDM) signal light in which optical pulses in a plurality of channels are time-division multiplexed enters the nonlinear optical fiber 11. The nonlinear optical fiber 11 has a practical length, e.g., 20 to 30 m. Specifically, in this example, the nonlinear optical fiber 11 is a highly nonlinear fiber (HNLF), in which the nonlinear phenomenon occurs with high efficiency, and therefore the nonlinear optical fiber 11 is hereinafter referred to as the HNLF 11.

The signal-light-polarization controller 12 controls the polarization direction of the signal light. The polarizer 13 is arranged at the output stage of the HNLF 11, and has a major polarization axis perpendicular to the polarization direction of the signal light at the input stage of the HNLF 11 which is controlled by the signal-light-polarization controller 12.

Specifically, the polarizer 13 has the function of an optical filter, and lets only major-polarization-axis components of light pass through. In addition, the signal-light-polarization controller 12 sets and controls the polarization direction of the signal light so as to be perpendicular to the major polarization axis of the polarizer 13 at the input stage of the HNLF 11.

The level monitoring unit 14 receives through the coupler C2 each optical pulse of the signal light as a switch output after the optical pulse is outputted from the HNLF 11, passes through the polarizer 13, and is filtered by the filter 16. Then, the level monitoring unit 14 monitors the level of the received optical pulse, compares the monitored level with a target level, and calculates the difference of the monitored level from the target level. The level monitoring unit 14 transfers the difference or the monitored level to the control-light setting unit 15.

The control-light setting unit 15 comprises a control-light generator 15a, a control-light polarization controller 15b, and a controller 15c. The control-light generator 15a generates an optical control pulse having a wavelength $\lambda p$ which is different from the wavelength $\lambda s$ of the signal light, and an excitation level which is variably set so as to bring the difference close to zero. In addition, each optical control pulse is generated in synchronization with an optical pulse of the signal light.

The control-light polarization controller 15b sets the polarization direction of the optical control pulse to form a predetermined angle (about 45 degrees) with the polarization direction of the signal light.

The controller 15c controls the entire system of the optical switch device 10. In particular, the controller 15c performs operations for overall control of the control-light generator 15a and the control-light polarization controller 15b which are necessary for setting the optical control pulses. For example, the controller 15c supplies to the control-light generator 15a and the control-light polarization controller 15b instructions for setting the optical levels of the optical control pulses and the angles which determine the polarization direction of the optical control pulses.

A maintenance terminal (not shown) can be connected to the controller 15c. Therefore, the operator can confirm the operational state of the system or a faulty channel, for example, by displaying on a screen of the maintenance terminal the monitored levels of optical pulses of the signal light in each channel which are transferred from the level monitoring unit 14. Further, the operator can set a target level of the optical pulses which are switched and outputted to the level monitoring unit 14, from the maintenance terminal through the controller 15c.

The control-light setting unit 15 generates an optical control pulse by setting an excitation level which is obtained by feedback control realized by the level monitoring unit 14 and the control-light generator 15a. Specifically, the excitation level of the optical control pulse is variably set within the range of power which is necessary for causing parametric amplification in the HNLF 11 so as to bring the aforementioned difference close to zero.

Then, the control-light setting unit 15 causes polarization rotation and parametric amplification of an optical pulse to be switched (i.e., a pulse of the signal light which is to be outputted as a switch output) in the HNLF 11 by inputting the above optical control pulse into the HNLF 11 in such a manner that the optical control pulse is in phase with the optical pulse to be switched, and the polarization direction of the optical control pulse is inclined at the predetermined angle. Thus, optical switching by use of the parametric amplification is performed so that the switch-output levels of the optical pulses are set to a desired level.

Incidentally, the polarization rotation and parametric amplification occur in only a time span in which the optical control pulse and the signal light concurrently exist. Therefore, the polarization rotation and parametric amplification do not occur in optical pulses other than the optical pulse to be switched. Details of the polarization rotation and parametric amplification are explained later.

The filter 16 is a band-pass filter which lets only the component of the signal light having the wavelength λs pass through, and cuts off light having the other wavelengths. That is, the light including the optical control pulse (having the wavelength λp) and light produced by amplified spontaneous emission (ASE) in the HNLF 11 are cut off by the filter 16.

However, in the case where the wavelength of the optical control pulse is far apart from the wavelength of the signal light, or the power of the signal light passing through the polarizer 13 is sufficiently great compared with the power of the light produced by ASE, or in other similar cases, the filter 16 is unnecessary.

Figure 2:
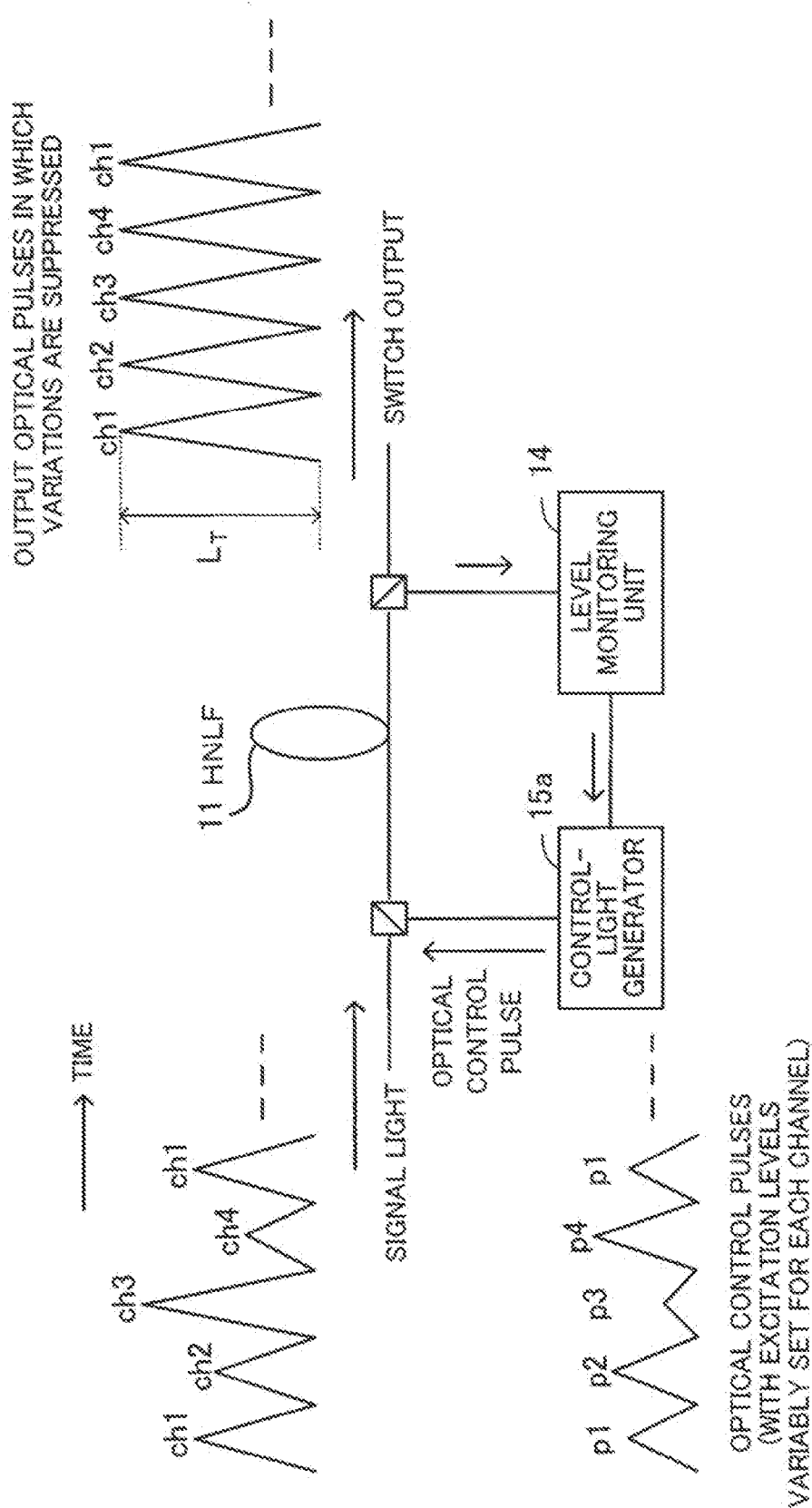
FIG. 2 is a diagram illustrating an outline of operations of the optical switch device according to the present invention.

Next, an outline of the operations of the optical switch device 10 according to the present invention is explained below with reference to FIG. 2, which shows an outline of the operations of the optical switch device 10. In FIG. 2, the signal light is a time-division multiplexed (TDM) optical signal in which optical pulses in the channels ch1 to ch4 are time-division multiplexed, and the levels of optical signals in the channels ch1 to ch4 are different.

In the initial state, the control-light generator 15a generates optical control pulses having an identical level (initial level) for optical pulses of the signal light in all the channels, and inputs the optical control pulses into the HNLF 11. Then, the filter 16 monitors the levels of the respective optical pulses outputted from the HNLF 11, calculates the difference between a target level and each of the monitored levels, and transfers the calculated difference to the control-light generator 15a.

Thereafter, while the optical switch device 10 is in operation, the control-light generator 15a generates an optical control pulse having an excitation level which is set on the basis of the difference in each channel, and inputs the optical control pulse into the HNLF 11, so that the variations in the switch-output levels of the optical pulses are suppressed.

Let $L_T$ be the target level of the switch-output levels of the optical pulses of the signal light in all the channels ch1 to ch4.

First, the control-light generator 15a generates an optical control pulse for an optical pulse in the channel ch1, where the level of the optical control pulse is set to the initial level. Then, the control-light generator 15a inputs the optical control pulse into the HNLF 11 at the same timing at which the optical pulse in the channel ch1 enters the HNLF 11 in such a manner that the polarization direction of the optical control pulse makes a predetermined angle with the polarization direction of the optical pulse in the channel ch1 at the input stage of the HNLF 11. The level monitoring unit 14 monitors the level of the optical pulse in the channel ch1 after the optical pulse is parametrically amplified during passage through the HNLF 11, and calculates the difference between the monitored level and the target level $L_T$.

The control-light generator 15a corrects the excitation level of each optical control pulse p1 for the channel ch1 so that the above difference approaches zero, and sets the excitation level so that the switch-output level of the optical pulse in the channel ch1 becomes equal to the target level $L_T$.

Similarly, the control-light generator 15a generates an optical control pulse for an optical pulse in the channel ch2, where the level of the optical control pulse is set to the initial level. Then, the control-light generator 15a inputs the optical control pulse into the HNLF 11 at the same timing at which the optical pulse in the channel ch2 enters the HNLF 11 in such a manner that the polarization direction of the optical control pulse makes a predetermined angle with the polarization direction of the optical pulse in the channel ch2 at the input stage of the HNLF 11. The level monitoring unit 14 monitors the level of the optical pulse in the channel ch2 after the optical pulse is parametrically amplified during passage through the HNLF 11, and calculates the difference between the monitored level and the target level $L_T$.

The control-light generator 15a corrects the excitation level of each optical control pulse p2 for the channel ch2 so that the above difference in the channel ch2 approaches zero, and sets the excitation level so that the switch-output level of the optical pulse in the channel ch2 becomes equal to the target level $L_T$.

Further, the control-light generator 15a also sets the excitation levels of optical control pulses p3 and p4 for the other channels ch3 and ch4 in similar manners.

As explained above, in the optical switch device 10 according to the present invention, optical switching is performed while the switch-output levels of the optical pulses is fed back, and the excitation levels of the optical control pulses are variably set on the basis of the switch-output levels of the optical pulses so that the levels of the optical pulses become equal to the target level $L_T$. Therefore, it is possible to suppress the variations in the switch-output levels of the optical pulses.

Although, in the above example, the switch-output levels of the optical pulses of the signal light in all the channels are controlled so as to be identical, it is possible to individually control the switch-output levels of the optical pulses of the signal light in the respective channels. That is, the switch-output levels of the optical pulses of the signal light in the plurality of channels can be individually set to desirable levels according to the receiving conditions of receivers which receive the optical pulses of the signal light outputted from the optical switch device 10 in the respective channels. In other words, it is possible to intentionally differentiate the switch-output levels of the optical pulses of the signal light on a channel-by-channel basis, and make the switch operation flexible.

In the case where the control-light generator 15a generates the optical control pulses p1 to p4, the wavelengths of all the optical control pulses p1 to p4 are identical to the zero-dispersion wavelength of the HNLF 11. This is because when the wavelengths of the optical control pulses and the average zero-dispersion wavelength of the HNLF 11 are approximately equalized, the phase of light newly generated by the nonlinear optical effect matches the phases of the optical control pulses, so that the efficiency in the parametric amplification (which is explained later) is increased. The average zero-dispersion wavelength is a wavelength at which the spread of the waveshapes of optical pulses (i.e., the wavelength dispersion) is minimized.

In addition, the gain in optical amplification varies with the wavelength. Therefore, when the wavelengths of optical control pulses are equalized, it is possible to equalize the gains of the optical control pulses in the operation of controlling the switch-output levels, and readily control the levels of the optical control pulses.

Optical Switching Operation

Hereinbelow, details of the optical switching operations performed by the optical switch device 10 are explained step by step.

Generally, the phenomena caused by nonlinear optical effects in nonlinear optical mediums are broadly divided into the nonlinear refraction-index variation and the nonlinear scattering.

The nonlinear refraction-index variation is a phenomenon in which the refraction index of a medium varies with the intensity of light. Typical examples of the nonlinear refraction-index variation are self-phase modulation (SPM), cross-phase modulation (XPM), and four-wave mixing (FWM). The SPM is a phenomenon in which a phase shift is caused by transmission of one light wave, i.e., the phase of the light wave is shifted by the intensity of the light wave per se. The XPM is a phenomenon in which a phase shift occurs when light waves having different wavelengths are concurrently transmitted in an identical direction, i.e., the phase of a light wave is shifted by the intensity of another light wave. The FWM is a phenomenon a new light wave is generated from two or more light waves. Although the nonlinear scattering includes the stimulated Raman scattering, the stimulated Brillouin scattering, and the like, the present invention is not related to the nonlinear scattering.

The effect causing the nonlinear refraction-index variation is called the optical Kerr effect. In the optical switching operations performed by the optical switch device 10, the polarization of the signal light inputted into the optical switch device 10 is rotated by the optical Kerr effect (which causes the XPM).

First, the rotation of the signal light and the optical switching realized by the rotation of the signal light are explained. For ease of explanation, an optical Kerr switch is considered below as a model of an optical switch which realizes optical switching by using the optical Kerr effect.

Figure 3:
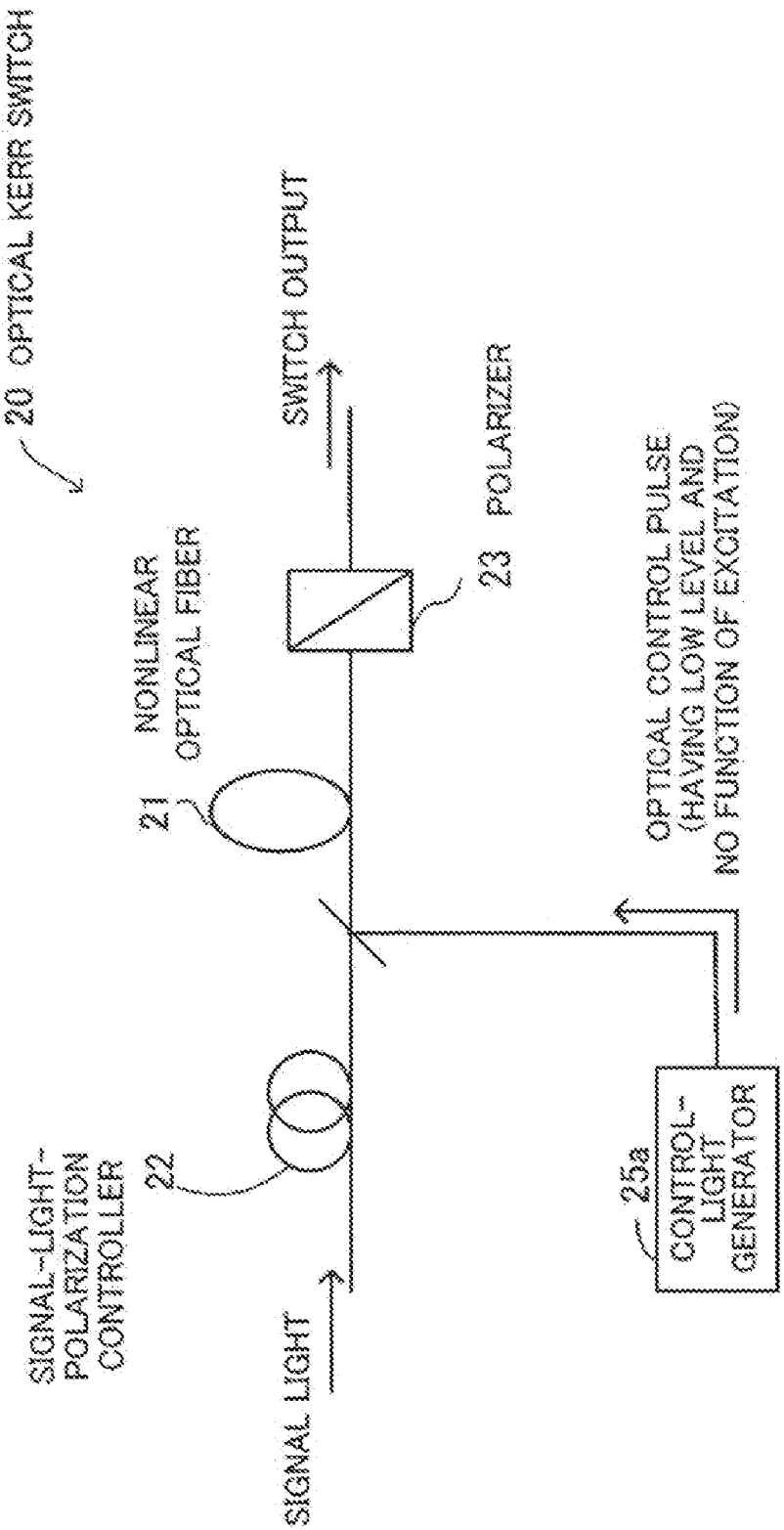
FIG. 3 is a diagram illustrating a construction of an optical Kerr switch.

FIG. 3 is a diagram illustrating a construction of the optical Kerr switch. The optical Kerr switch 20 of FIG. 3 comprises a nonlinear optical fiber 21, a signal-light polarization controller 22, a polarizer 23, and a control-light generator 25a. Signal light and optical control pulses enter the nonlinear optical fiber 21. The levels of the optical control pulses used in the optical Kerr switch 20 are low, so that the optical control pulses used in the optical Kerr switch 20 do not have the function of excitation. The signal-light polarization controller 22 is arranged to make the polarization direction of the signal light perpendicular to the major polarization axis of the polarizer 23 at the input stage of the nonlinear optical fiber 21.

Figure 4:
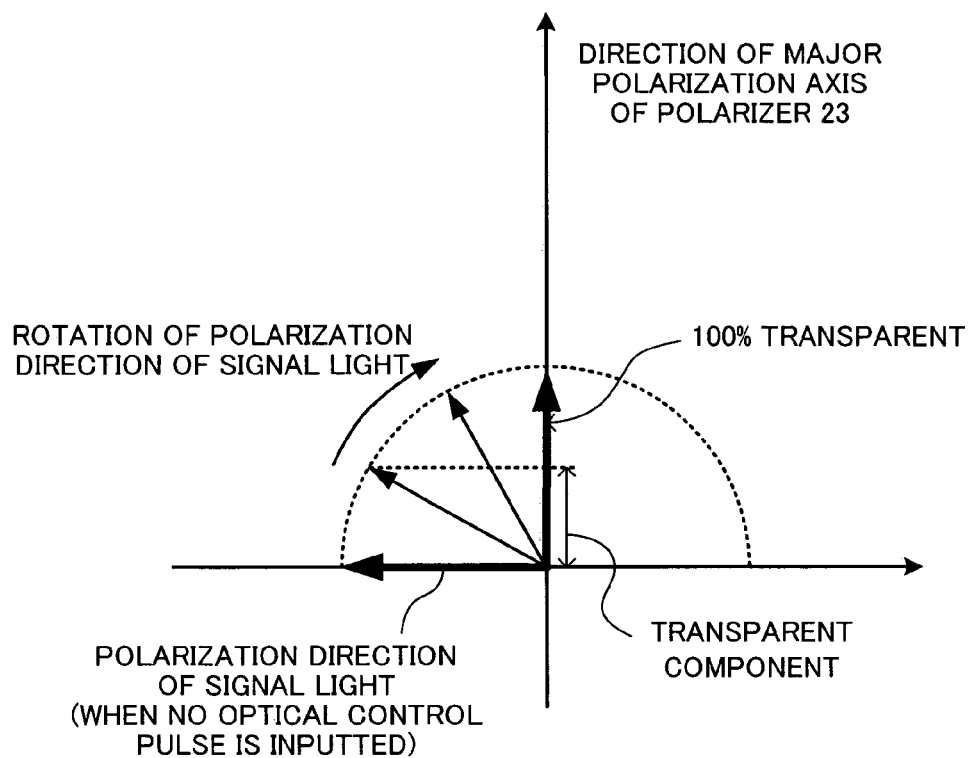
FIG. 4 is a diagram illustrating polarization rotation.

FIG. 4 is a diagram illustrating polarization rotation. When the control-light generator 25a does not generate an optical control pulse, and the power of the optical control pulse is zero, the polarization direction of the signal light is not rotated in the nonlinear optical fiber 21. In this case, since the polarization direction of the signal light outputted from the nonlinear optical fiber 21 is perpendicular to the major polarization axis of the polarizer 23, the signal light is completely shut off by the polarizer 23.

On the other hand, assume that an optical control pulse is generated by the control-light generator 25a, and inputted into the nonlinear optical fiber 21 at the same timing as an optical pulse of the signal light. When an optical pulse and an optical control pulse overlap in time (are in phase), and the power of the optical control pulse is increased above a certain level, the polarization direction of the signal light rotates with increase in the power of the optical control pulse in the nonlinear optical fiber 21 as indicated in FIG. 4, so that a component of the signal light becomes able to pass through the polarizer 23.

Further, when the power of the optical control pulse is appropriately controlled so as to shift the phase of the signal light (i.e., to rotate the polarization direction of the signal light) by 90 degrees from the phase (the polarization direction) of the signal light at the input stage of the nonlinear optical fiber 21, the polarization direction of the signal light coincides with the major polarization axis of the polarizer 23. Therefore, at this time, almost 100% of the signal light passes through the polarizer 23. That is, when an optical control pulse with a power level necessary for rotating the polarization direction of the signal light by exactly 90 degrees is inputted into the nonlinear optical fiber 21, it is possible to efficiently extract the signal light.

Thus, quick optical switching by use of a nonlinear optical effect (the optical Kerr effect) can be realized by changing the intensity of the optical control pulse so as to change the angle between the polarization direction of the signal light and the major polarization axis of the polarizer 23 between 0 and 90 degrees. However, in this case, only the optical switching is realized, and it is impossible to obtain output light having power greater than the input power of the signal light. In other words, the signal light is merely rotated, and is not amplified.

Next, the operations of the optical switch device 10 according to the present invention, which include the parametric amplification, are explained below.

In the optical switching operations performed in the optical switch device 10, optical control pulses as excitation light are supplied to the HNLF 11 so as to cause parametric amplification in the HNLF 11, and achieve high switching efficiency.

In the aforementioned optical Kerr switch 20, the power of the optical control pulses inputted into the nonlinear optical fiber 21 is very low, so that the optical control pulses do not have the function of excitation light. Therefore, the switching is realized in the optical Kerr switch 20 by changing the levels of the optical control pulses within a low-power range.

On the other hand, the power of the optical control pulses inputted into the HNLF 11 in the optical switch device 10, which cause the parametric amplification, is far higher than the power of the optical control pulses inputted into the nonlinear optical fiber 21 in the optical Kerr switch 20, and the optical control pulses inputted into the HNLF 11 in the optical switch device 10 have the function of the excitation light. In the optical switch device 10, the levels of the optical control pulses are changed within a high-power range in which the power is sufficient to cause the parametric amplification.

Hereinbelow, a general definition of the parametric amplification is explained.

The parametric amplification is a phenomenon of amplification caused by the parametric effect occurring in the wavelength of light. The parametric effect is a process of generating light waves having new angular frequencies $\omega n$, $\omega n+1$, ... from incident light waves having angular frequencies $\omega 1$, $\omega 2$, ... in a nonlinear optical medium. In most instances, the parametric effect is a phenomenon in which light waves having a plurality of low angular frequencies $\omega 1$, $\omega 2$, ... satisfying $\omega p = \omega 1 + \omega 2 + \ldots$ is generated when a strong light wave (excitation light) having the angular frequency ($\omega p$ enters a nonlinear optical medium. This phenomenon corresponds to an inverse process of the optical mixing. The optical mixing is a phenomenon in which a light wave having an angular frequency $\omega p$ satisfying $\omega p = \omega 1 \pm \omega 2 \pm \ldots$ is generated when light waves having a plurality of angular frequencies $\omega 1$, $\omega 2$, ... enter a nonlinear optical medium.

A known example of the optical mixing is the aforementioned four-wave mixing (FWM). The FWM is a phenomenon in which light waves having angular frequencies $\omega 3$ and $\omega 4$ are generated through third-order nonlinear polarization when light waves having angular frequencies $\omega 1$ and $\omega 2$ enter a nonlinear optical medium.

Generally, the parametric amplification is realized by the following process.

That is, two light waves having angular frequencies $\omega s$ and $\omega i$ (which are respectively called signal light and idler light) are generated from excitation light having the angular frequency $\omega p$ ($=\omega s+\omega i$) by the parametric effect. In the case where the above light waves satisfy a phase-matching condition (i.e., when the above light waves are in phase), a first light wave having the angular frequency $\omega i$ is generated from even an initially weak light wave having the angular frequency $\omega s$ by recoupling of the initially weak light having the angular frequency $\omega s$ with the excitation light having the angular frequency $\omega p$, and then a second light wave having the angular frequency $\omega s$ is generated from the above first light wave having the angular frequency $\omega i$ by recoupling of the first light wave having the angular frequency $\omega i$ with the excitation light having the angular frequency $\omega p$. Thereafter, similar operations of generating a light wave having the angular frequency $\omega i$ and a light wave having the angular frequency $\omega s$ by recoupling with the excitation light are repeated, so that the light at the angular frequency $\omega i$ or the light at the angular frequency $\omega s$ is amplified by the pumping with the excitation light.

Next, the optical switching operations of the optical switch device 10 by use of the parametric amplification are explained below.

In the optical switch device 10, optical pulses of the signal light and corresponding optical control pulses are optically combined and inputted into the HNLF 11, and the polarization direction of each optical pulse to be switched, among the optical pulses of signal light, is rotated in the HNLF 11. At the same time, the optical pulse to be switched is parametrically amplified and is then extracted. Thus, optical switching is realized.

It is known that the efficiency in the parametric amplification is maximized when the polarization directions of light waves which interact with each other in a nonlinear optical medium coincide, and almost no parametric amplification occurs when the polarization directions of light waves which interact with each other in a nonlinear optical medium are perpendicular to each other.

In the optical switch device 10 of FIG. 1, the control-light polarization controller 15b sets the polarization direction of each optical control pulse so that the polarization direction of each optical control pulse makes an angle of approximately 45 degrees with the polarization direction of the signal light at the input end of the HNLF 11. Hereinafter, for simple explanation, the angle between the polarization directions of the signal light and each optical control pulse is assumed to be set to 45 degrees at the input end of the HNLF 11.

The efficiency of the parametric amplification in the case where the angle between the polarization directions of the signal light and each optical control pulse is set to 45 degrees at the input end of the HNLF 11 is seemingly lower than the efficiency in the case where the polarization directions of the signal light and each optical control pulse coincide at the input end of the HNLF 11. However, the polarization direction of the signal light is rotated by the cross-phase modulation (XPM) with increase in the power of the optical control pulse as explained before with reference to FIG. 4. Therefore, as the rotation angle of the polarization direction of the signal light in the HNLF 11 approaches 45 degrees, the polarization direction of the signal light becomes close to the polarization direction of the optical control pulse, so that the parametric gain gradually increases. Thereafter, when the rotation angle of the polarization direction of the signal light reaches 45 degrees, the polarization direction of the signal light coincides with the polarization direction of the optical control pulse, and the parametric gain is maximized.

Figure 5:
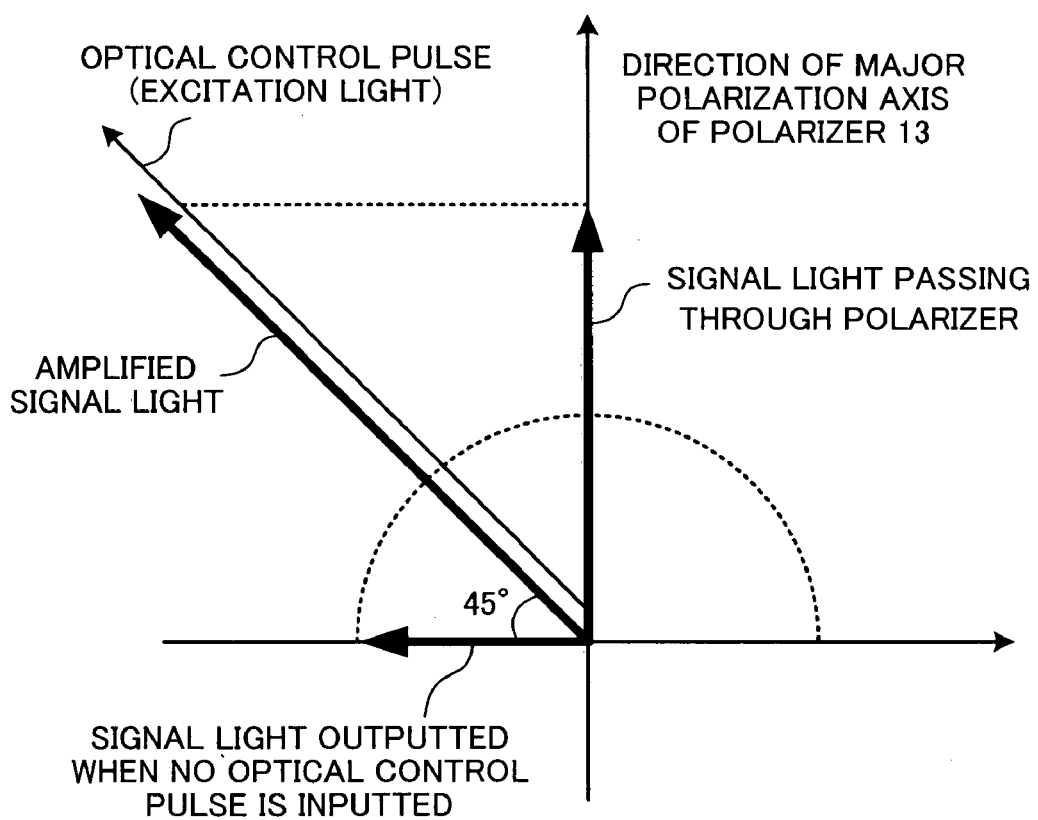
FIG. 5 is a diagram provided for explaining optical switching by use of parametric amplification.

FIG. 5 is a diagram provided for explaining optical switching by use of the parametric amplification. When the control-light generator 15a does not output an optical control pulse, the phase of the signal light is not rotated in the HNLF 11. Therefore, the polarization direction of the signal light remains perpendicular to the major polarization axis of the polarizer 13, so that the signal light is completely shut off by the polarizer 13.

On the other hand, when an optical control pulse enters the HNLF 11 (in such a manner that the angle between the polarization directions of the signal light and each optical control pulse is 45 degrees at the input stage of the HNLF 11), the polarization direction of the signal light is rotated with increase in the power of the optical control pulse as explained with reference to FIG. 4. Then, when the rotation angle of the polarization direction of the signal light reaches 45 degrees, the polarization direction of the signal light coincides with the polarization direction of the optical control pulse, so that the efficiency in the parametric amplification is maximized.

Although, in the parametric amplification occurring in the HNLF 11, each optical control pulse, which is supplied as excitation light, causes generation of a new component of light having the same wavelength as the signal light, the component newly generated by the parametric amplification is not affected by the optical Kerr effect (which causes the XPM), so that the polarization direction of the component is not rotated.

That is, when an optical control pulse having sufficient excitation power for causing the parametric amplification enters the HNLF 11 in such a manner that the polarization direction of the optical control pulse makes the angle of 45 degrees with the polarization direction of the signal light, the signal light is rotated by 45 degrees in the HNLF 11, so that the polarization directions of the signal light and the optical control pulse coincide and the efficiency in the parametric amplification is maximized. At this time, the signal light amplified by the parametric amplification becomes free from the optical Kerr effect (which causes the XPM), and the polarization direction of the signal light no longer rotates (i.e., is fixed).

In summary, the levels of the optical control pulses used in the optical Kerr switch 20 are so low that the parametric amplification does not occur even when such optical control pulses enter the nonlinear optical fiber. Therefore, only the polarization rotation of the signal light corresponding to the power of the optical control pulses occurs.

On the other hand, the levels of the optical control pulses used in the optical switch device 10 according to the present invention are sufficiently high for the parametric amplification. Therefore, when each of such optical control pulses enters the HNLF 11 in such a manner that the polarization direction of the optical control pulse makes the angle of 45 degrees with the polarization direction of the signal light at the input stage of the HNLF 11, the polarization direction of the signal light is rotated by the optical Kerr effect until the efficiency of the parametric amplification is maximized. When the polarization direction of the signal light reaches the polarization direction of the optical control pulse (by rotation of 45 degrees), the efficiency of the parametric amplification is maximized. At this time, the signal light becomes free from the optical Kerr effect, and the polarization rotation of the signal light stops.

That is, the polarization direction of the signal light no longer rotates after the polarization direction of the signal light reaches the polarization direction of the optical control pulse and the efficiency in the parametric amplification is maximized. In particular, even when the power of each optical control pulse is variably set within the power range within which the parametric amplification occurs efficiently, the polarization direction of the signal light does not rotate and is fixed at the angle of 45 degrees. Thus, only the amount of the amplification of the signal light is changed with the power of each optical control pulse while the polarization direction of the signal light is fixed at the angle of 45 degrees.

At this time, the polarization direction of the amplified signal light makes the angle of 45 degrees with the major polarization axis of the polarizer 13. Therefore, when the amplitude of the amplified signal light is indicated by g, the power of the signal light outputted from the polarizer 13 becomes $g/\sqrt{2}$ as illustrated in FIG. 5.

As explained above, although the amplification efficiency is not 100%, the power of the output of the polarizer 13 (i.e., the output of the optical switch device 10) is sufficiently great compared with the power of the signal light at the input stage of the optical switch device 10. Specifically, the parametric amplification can achieve the amplification gain of 10 or greater. Therefore, it is possible to remarkably improve the switching efficiency from the conventional optical switch.

In addition, when the optical switch device 10 using the parametric amplification is in the OFF state, in which no optical control pulse is inputted into the HNLF 11, the polarization direction of the signal light is perpendicular to the major polarization axis of the polarizer 13. Therefore, at this time, the signal light is completely shut off by the polarizer 13. On the other hand, when the optical switch device 10 using the parametric amplification is in the ON state, in which an optical control pulse is inputted into the HNLF 11, the optical switch device 10 outputs an optical pulse of the signal light which is parametrically amplified. Thus, it is possible to achieve a very satisfactory extinction ratio and SNR.

Further, the nonlinear optical effect, which causes the XPM or FWM and is utilized in the HNLF 11 in the optical switch device 10 for optical switching, is an extremely fast optical phenomenon having a response speed on the order of femtoseconds (fs). Therefore, the optical switch device 10 can realize Tera-b/s optical switching, which is far faster than the optical switching realized by the conventional optical switch.

Figure 6:
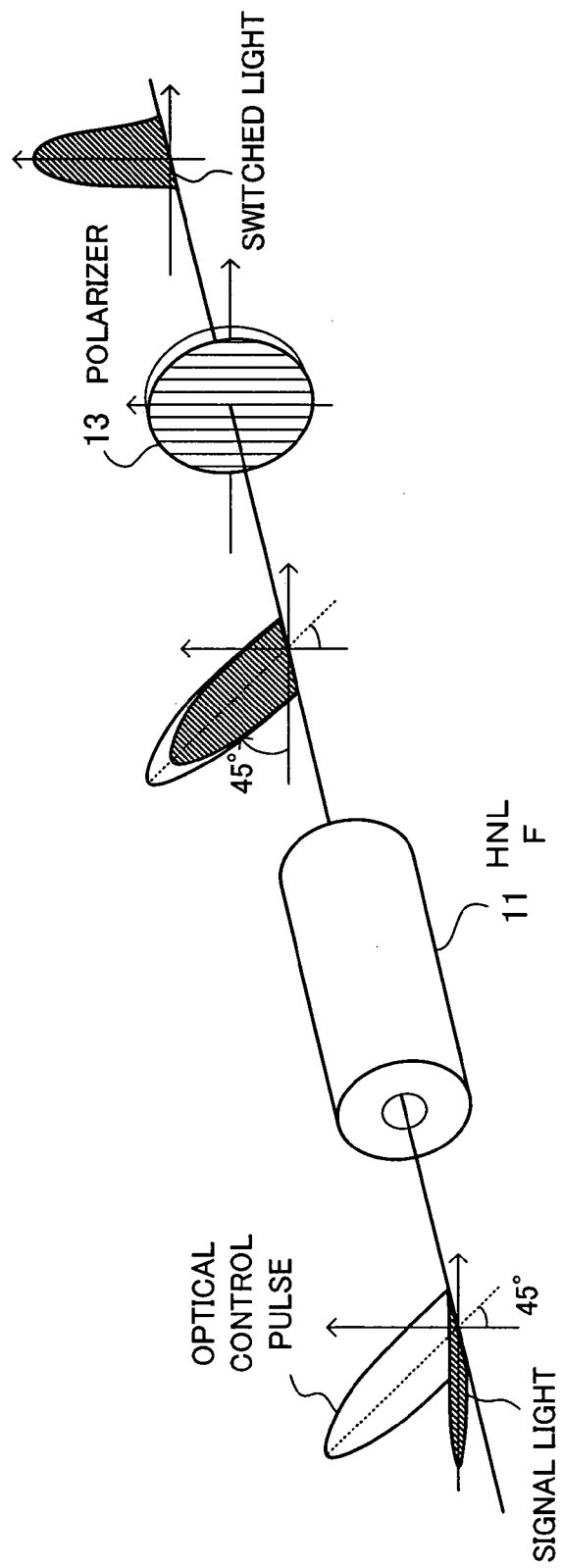
FIG. 6 is a diagram illustrating polarization states of an optical pulse of signal light and an optical control pulse.

FIG. 6 is a diagram illustrating polarization states of an optical pulse of the signal light and an optical control pulse when optical switching is performed by use of the parametric amplification. In FIG. 6, a schematic illustration of the polarization states of the optical pulse of the signal light and the optical control pulse at representative stages is superimposed on a schematic illustration of the optical switch device 10.

Each optical control pulse having a certain excitation level enters the HNLF 11 in phase with an optical pulse of the signal light which also enters the HNLF 11. At this time, the polarization direction of the optical control pulse makes an angle of 45 degrees with the optical pulse of the signal light. Then, polarization rotation and parametric amplification occur in the HNLF 11, so that the polarization direction of the signal light becomes identical to the polarization direction of the optical control pulse, and the power of the signal light is increased by the parametric amplification. In the example illustrated in FIG. 6, the major polarization axis of the polarizer 13 is in the vertical direction. In this case, the vertical component of the optical pulse of the signal light rotated and amplified in the HNLF 11 as above passes through the polarizer 13 and is outputted from the optical switch device 10.

Control of Optical Level

Hereinbelow, adaptive control for setting the switch-output levels of optical pulses of the signal light in the optical switch device 10 according to each of first to third embodiments of the present invention is explained. In the following explanations, it is assumed that the signal light is a time-division multiplexed (TDM) optical signal in which optical pulses in the channels ch1 to ch4 are time-division multiplexed, the control-light generator 15a generates the optical control pulses p1 to p4 for the channels ch1 to ch4 in synchronization with respectively corresponding optical pulses of the signal light, and the angle between the polarization directions of the signal light and each optical control pulse is 45 degrees when the signal light and the optical control pulse enter the HNLF 11.

First, exemplary sequences of operations of the optical switch device according to the first embodiment are explained below.

Figure 7:
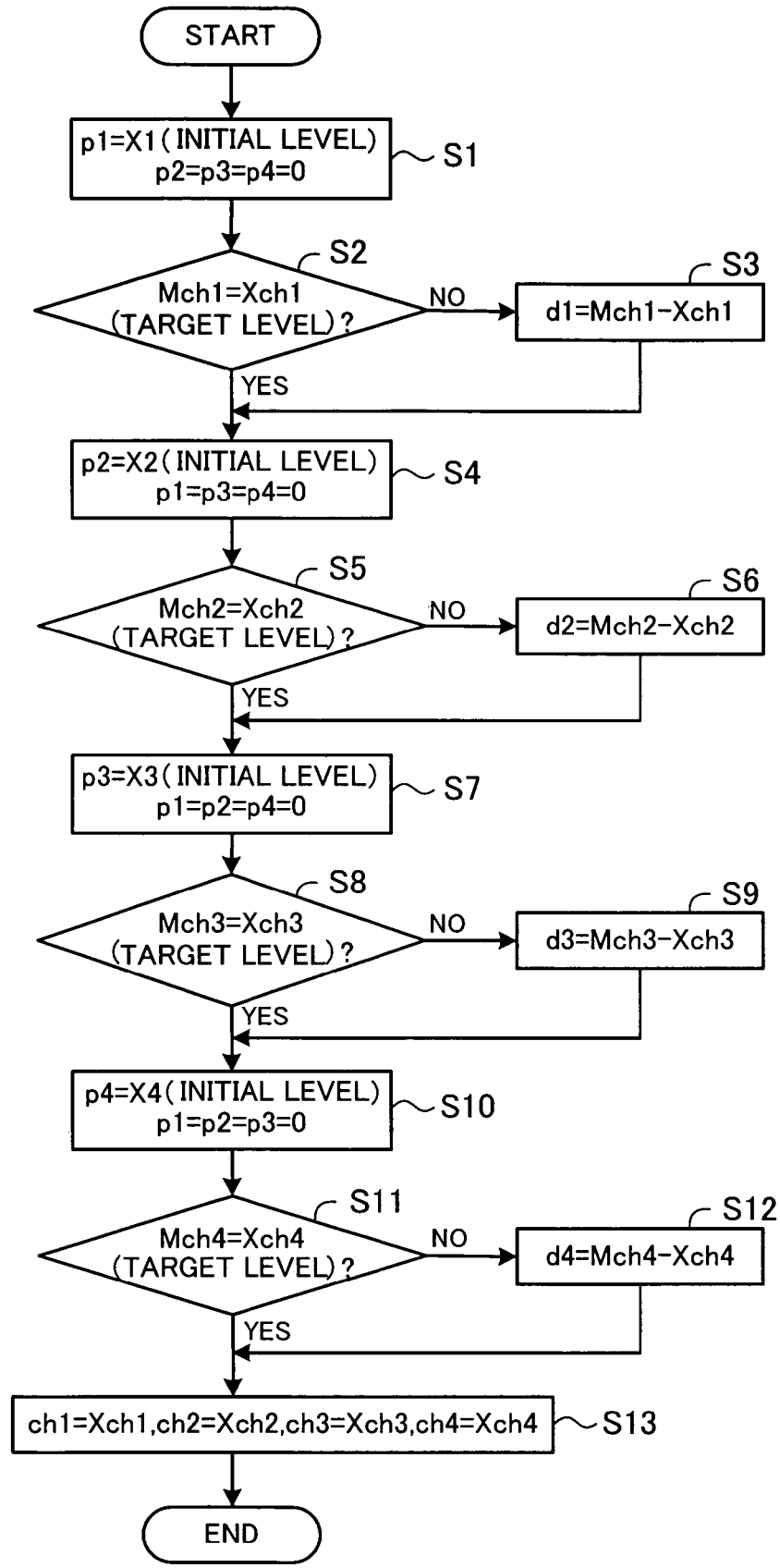
FIG. 7 is a flow diagram indicating a first exemplary sequence of operations of an optical switch device according to a first embodiment.

FIG. 7 is a flow diagram indicating a first exemplary sequence of operations of the optical switch device according to the first embodiment. The sequence of FIG. 7 also corresponds to the operations which are explained before with reference to FIG. 2.

<S1> The control-light generator 15a generates optical control pulses p1 with their initial levels set to X1, and inputs the optical control pulses p1 into the HNLF 11 at the same timings as optical pulses of the signal light in the channel ch1. At this time, the levels of the optical control pulses p2 to p4 are set to zero.

<S2> The level monitoring unit 14 receives through the coupler C2 the optical pulses of the signal light in the channel ch1 outputted from the filter 16, performs opto-electric (O/E) conversion of the received optical pulses, and monitors the levels of the received optical pulses. When the monitored levels Mch1 are equal to a target level Xch1, the operation goes to step S4. Otherwise, the operation goes to step S3.

<S3> The level monitoring unit 14 calculates a value d1 indicating the difference between each of the monitored levels Mch1 and the target level Xch1, and transfers the value d1 to the control-light setting unit 15.

<S4> The control-light generator 15a generates optical control pulses p2 with their initial levels set to X2, and inputs the optical control pulses p2 into the HNLF 11 at the same timings as optical pulses of the signal light in the channel ch2. At this time, the levels of the optical control pulses p1, p3, and p4 are set to zero.

<S5> The level monitoring unit 14 receives through the coupler C2 the optical pulses of the signal light in the channel ch2 outputted from the filter 16, performs O/E conversion of the received optical pulses, and monitors the levels of the received optical pulses. When the monitored levels Mch2 are equal to a target level Xch2, the operation goes to step S7. Otherwise, the operation goes to step S6.

<S6> The level monitoring unit 14 calculates a value d2 indicating the difference between each of the monitored levels Mch2 and the target level Xch2, and transfers the value d2 to the control-light setting unit 15.

<S7> The control-light generator 15a generates optical control pulses p3 with their initial levels set to X3, and inputs the optical control pulses p3 into the HNLF 11 at the same timings as optical pulses of the signal light in the channel ch3. At this time, the levels of the optical control pulses p1, p2, and p4 are set to zero.

<S8> The level monitoring unit 14 receives through the coupler C2 the optical pulses of the signal light in the channel ch3 outputted from the filter 16, performs O/E conversion of the received optical pulses, and monitors the levels of the received optical pulses. When the monitored levels Mch3 are equal to a target level Xch3, the operation goes to step S10. Otherwise, the operation goes to step S9.

<S9> The level monitoring unit 14 calculates a value d3 indicating the difference between the monitored levels Mch3 and the target level Xch3, and transfers the value d3 to the control-light setting unit 15.

<S10> The control-light generator 15*a* generates optical control pulses p4 with their initial levels set to X4, and inputs the optical control pulses p4 into the HNLF 11 at the same timings as optical pulses of the signal light in the channel ch4. At this time, the levels of the optical control pulses p1, p2, and p3 are set to zero.

<S11> The level monitoring unit 14 receives through the coupler C2 the optical pulses of the signal light in the channel ch4 outputted from the filter 16, performs O/E conversion of the received optical pulses, and monitors the levels of the received optical pulses. When the monitored levels Mch4 are equal to a target level Xch4, the operation goes to step S13. Otherwise, the operation goes to step S12.

<S12> The level monitoring unit 14 calculates a value d4 indicating the difference between each of the monitored levels Mch4 and the target level Xch4, and transfers the value d4 to the control-light setting unit 15.

<S13> The control-light generator 15*a* corrects the initial levels X1 to X4 of the optical control pulses p1 to p4 so as to bring the values d1 to d4 (obtained in steps S3, S6, S9, and S12) closer to zero and control the levels of the optical pulses of the signal light in the channels ch1 to ch4. For example, the output levels of the optical pulses of the signal light in the channel ch1 are brought to Xch1 by correcting the initial level of the optical control pulses p1 to X1c so that the value d1 indicating the difference calculated by the level monitoring unit 14 becomes zero, and inputting new optical control pulses p1 having the corrected level X1c into the HNLF 11. In addition, the output levels of the optical pulses of the signal light in the channel ch2 are brought to Xch2 by correcting the initial level of the optical control pulses p2 to X2c so that the value d2 indicating the difference calculated by the level monitoring unit 14 becomes zero, and inputting new optical control pulses p2 having the corrected level X2c into the HNLF 11. Similarly, the levels of the optical pulses of the signal light in the channels ch3 and ch4 are controlled at the levels Xch3 and Xch4, respectively.

Figure 8:
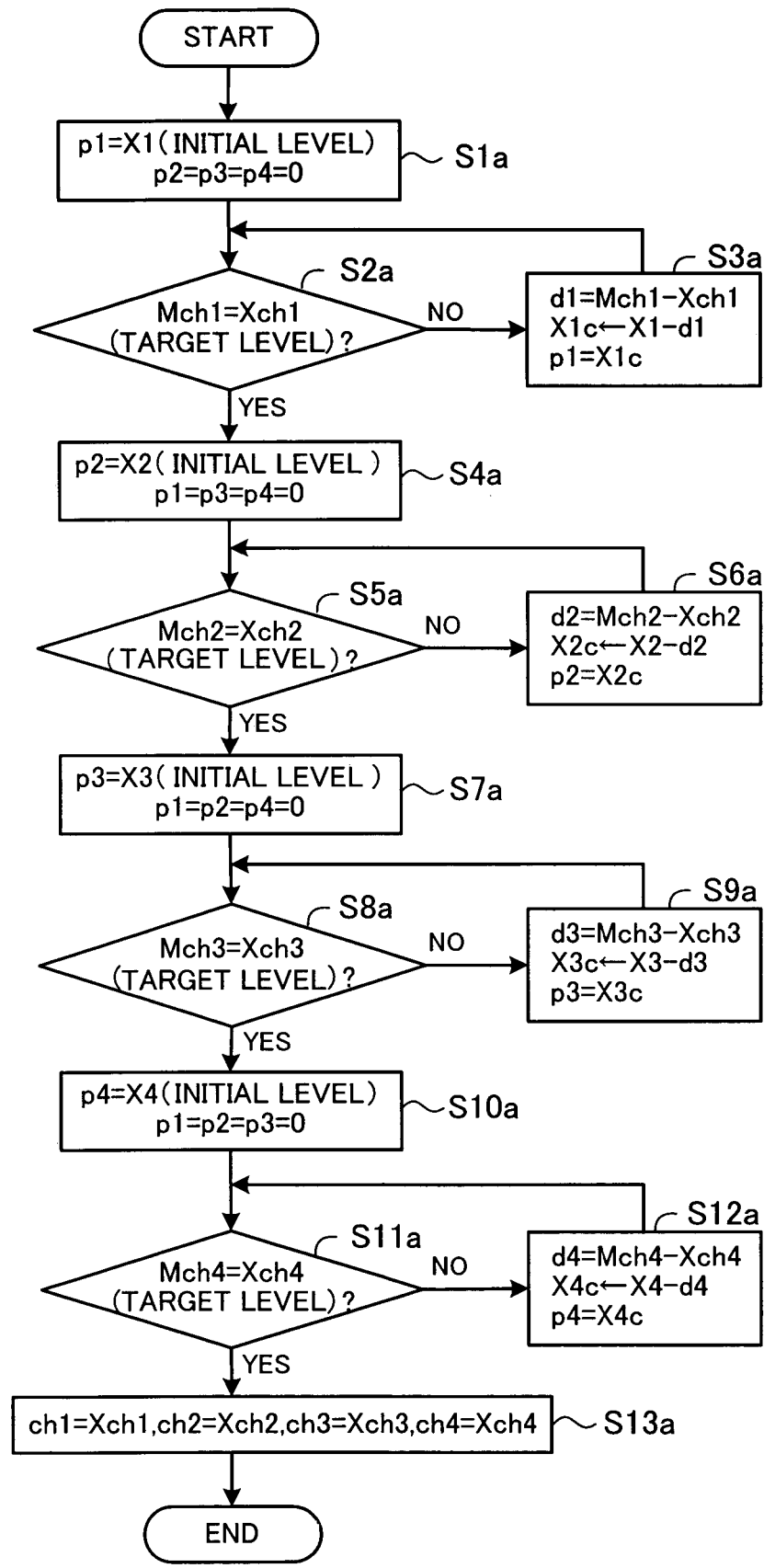
FIG. 8 is a flow diagram indicating a second exemplary sequence of operations of the optical switch device according to the first embodiment.

FIG. 8 is a flow diagram indicating a second exemplary sequence of operations of the optical switch device according to the first embodiment.

<S1*a*> The control-light generator 15*a* generates optical control pulses p1 with their initial levels set to X1, and inputs the optical control pulses p1 into the HNLF 11 at the same timings as optical pulses of the signal light in the channel ch1. At this time, the levels of the optical control pulses p2 to p4 are set to zero.

<S2*a*> The level monitoring unit 14 receives through the coupler C2 the optical pulses of the signal light in the channel ch1 outputted from the filter 16, performs opto-electric (O/E) conversion of the received optical pulses, and monitors the levels of the received optical pulses. When the monitored levels Mch1 are equal to a target level Xch1, the operation goes to step S4*a*. Otherwise, the operation goes to step S3*a*.

<S3*a*> The level monitoring unit 14 calculates a value d1 indicating the difference between each of the monitored levels Mch1 and the target level Xch1, and transfers the value d1 to the control-light setting unit 15. The control-light generator 15*a* corrects the levels of the optical control pulses p1 to X1c so that the value d1 indicating the difference calculated by the level monitoring unit 14 becomes zero, and inputs new optical control pulses p1 having the corrected level X1c into the HNLF 11. Then, the operation goes to step S2*a*, and the correction is repeated until the monitored levels reach the target level Xch1.

<S4*a*> The control-light generator 15*a* generates optical control pulses p2 with their initial levels set to X2, and inputs the optical control pulses p2 into the HNLF 11 at the same timings as optical pulses of the signal light in the channel ch2. At this time, the levels of the optical control pulses p1, p3, and p4 are set to zero.

<S5*a*> The level monitoring unit 14 receives through the coupler C2 the optical pulses of the signal light in the channel ch2 outputted from the filter 16, performs O/E conversion of the received optical pulses, and monitors the levels of the received optical pulses. When the monitored levels Mch2 are equal to a target level Xch2, the operation goes to step S7*a*. Otherwise, the operation goes to step S6*a*.

<S6*a*> The level monitoring unit 14 calculates a value d2 indicating the difference between each of the monitored levels Mch2 and the target level Xch2, and transfers the value d2 to the control-light setting unit 15. The control-light generator 15*a* corrects the levels of the optical control pulses p2 to X2c so that the value d2 indicating the difference calculated by the level monitoring unit 14 becomes zero, and inputs new optical control pulses p2 having the corrected level X2c into the HNLF 11. Then, the operation goes to step S5*a*, and the correction is repeated until the monitored levels reach the target level Xch2.

<S7*a*> The control-light generator 15*a* generates optical control pulses p3 with their initial levels set to X3, and inputs the optical control pulses p3 into the HNLF 11 at the same timings as optical pulses of the signal light in the channel ch3. At this time, the levels of the optical control pulses p1, p2, and p4 are set to zero.

<S8*a*> The level monitoring unit 14 receives through the coupler C2 the optical pulses of the signal light in the channel ch3 outputted from the filter 16, performs O/E conversion of the received optical pulses, and monitors the levels of the received optical pulses. When the monitored levels Mch3 are equal to a target level Xch3, the operation goes to step S10*a*. Otherwise, the operation goes to step S9*a*.

<S9*a*> The level monitoring unit 14 calculates a value d3 indicating the difference between each of the monitored levels Mch3 and the target level Xch3, and transfers the value d3 to the control-light setting unit 15. The control-light generator 15*a* corrects the levels of the optical control pulses p3 to X3c so that the value d3 indicating the difference calculated by the level monitoring unit 14 becomes zero, and inputs new optical control pulses p3 having the corrected level X3c into the HNLF 11. Then, the operation goes to step S8*a*, and the correction is repeated until the monitored levels reach the target level Xch3.

<S10*a*> The control-light generator 15*a* generates optical control pulses p4 with their initial levels set to X4, and inputs the optical control pulses p4 into the HNLF 11 at the same timings as optical pulses of the signal light in the channel ch4. At this time, the levels of the optical control pulses p1, p2, and p3 are set to zero.

<S11*a*> The level monitoring unit 14 receives through the coupler C2 the optical pulses of the signal light in the channel ch4 outputted from the filter 16, performs O/E conversion of the received optical pulses, and monitors the levels of the received optical pulses. When the monitored levels Mch4 are equal to a target level Xch4, the operation goes to step S13*a*. Otherwise, the operation goes to step S12*a*.

<S12*a*> The level monitoring unit 14 calculates a value d4 indicating the difference between each of the monitored levels Mch4 and the target level Xch4, and transfers the value d4 to the control-light setting unit 15. The control-light generator 15a corrects the levels of the optical control pulses p4 to X4c so that the value d4 indicating the difference calculated by the level monitoring unit 14 becomes zero, and inputs new optical control pulses p4 having the corrected level X4c into the HNLF 11. Then, the operation goes to step S11a, and the correction is repeated until the monitored levels reach the target level Xch4.

<S13a> The control-light generator 15a corrects the initial levels X1 to X4 of the optical control pulses p1 to p4 for the channels ch1 to ch4 so as to bring the values d1 to d4 (obtained in steps S3a, S6a, S9a, and S12a) closer to zero, and the levels of the optical pulses of the signal light in the channels ch1 are controlled at ch4.

In the first exemplary sequence of operations according to the first embodiment (explained with reference to FIG. 7), the levels of the optical control pulses for each channel are corrected on the basis of the difference from the target level by only one operation. Therefore, the precision in the derivation of the corrected levels from each value indicating the difference determines the error from the target level. However, since the difference is determined only once for each channel, the processing speed in the first exemplary sequence is high. On the other hand, in the second exemplary sequence of operations according to the first embodiment (explained with reference to FIG. 8), the correction is repeated until the target level is reached. Therefore, according to the second exemplary sequence, the processing speed is low, although high precision in the derivation of the corrected level from each value indicating the difference is not required.

Next, exemplary sequences of operations of the optical switch device according to the second embodiment are explained below.

According to the first embodiment, the levels of the optical control pulses for each channel are set in succession while the levels of the optical control pulses for the other channels (which may include one or more channels in which the levels of the optical control pulses are already set) are maintained at zero. That is, each channel is not in operation until the setting of the levels of the optical control pulses for all the channels is completed. On the other hand, according to the second embodiment, the levels of the optical control pulses for each channel are set in succession while one or more other channels in which the levels of the optical control pulses have already been set are in operation.

According to the second embodiment, first, the levels of the optical control pulses p1 in the channel ch1 (as a first one of the channels) are set so as to bring the output levels of the optical pulses of the signal light in the channel ch1 to a target level Xch1.

Next, when the levels of the optical control pulses p2 for the channel ch2 (as a second one of the channel) are set, the level monitoring unit 14 monitors the switch-output levels of the optical pulses of the signal light in the channels ch1 and ch2. At this time, the optical control pulses p1 for the channel ch1 are at the target level Xch1, the optical control pulses p2 for the channel ch2 are at the initial level X2, and the optical control pulses p3 and p4 for the channels ch3 and ch4 are at the zero level.

In the above operation of setting the levels of the optical control pulses p2 for the channel ch2, when the optical pulses of the signal light in the channel ch2 reach the target level Xch2, the output levels Mch1,ch2 monitored by the level monitoring unit 14 become equal to the level corresponding to Xch1+Xch2. Therefore, it is unnecessary to correct the setting of the levels of the optical control pulses p2, and the operation of setting the levels of the optical control pulses p2 for the channel ch2 is completed.

Figure 9:
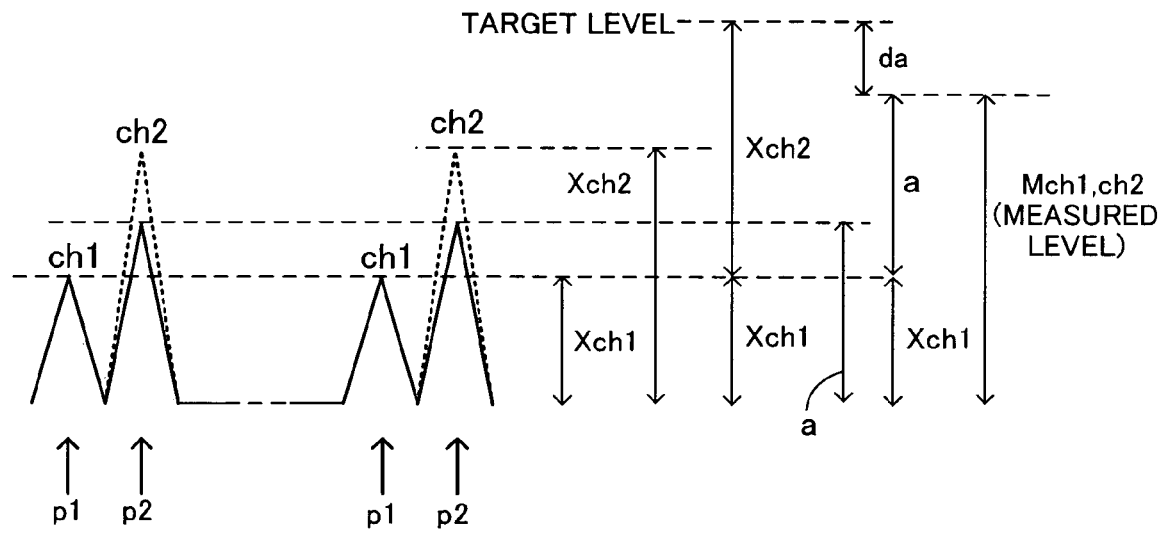
FIG. 9 is a first diagram illustrating an outline of operations of an optical switch device according to a second embodiment.

However, when the output levels Mch1,ch2 monitored by the level monitoring unit 14 are lower than the level corresponding to Xch1+Xch2, the level monitoring unit 14 calculates a value da indicating the difference between each of the monitored levels Mch1,ch2 and Xch1+Xch2 (i.e., da=(Xch1+Xch2)−Mch1,ch2), and the control-light generator 15a corrects the initial level X2 of the optical control pulses for the channel ch2 so as to raise the initial level X2 and bring the value da closer to zero, and outputs optical control pulses p2 having the corrected level. FIG. 9 shows an outline of the operations performed by the optical switch device according to the second embodiment in the case where Mch1,ch2<Xch1+Xch2.

Figure 10:
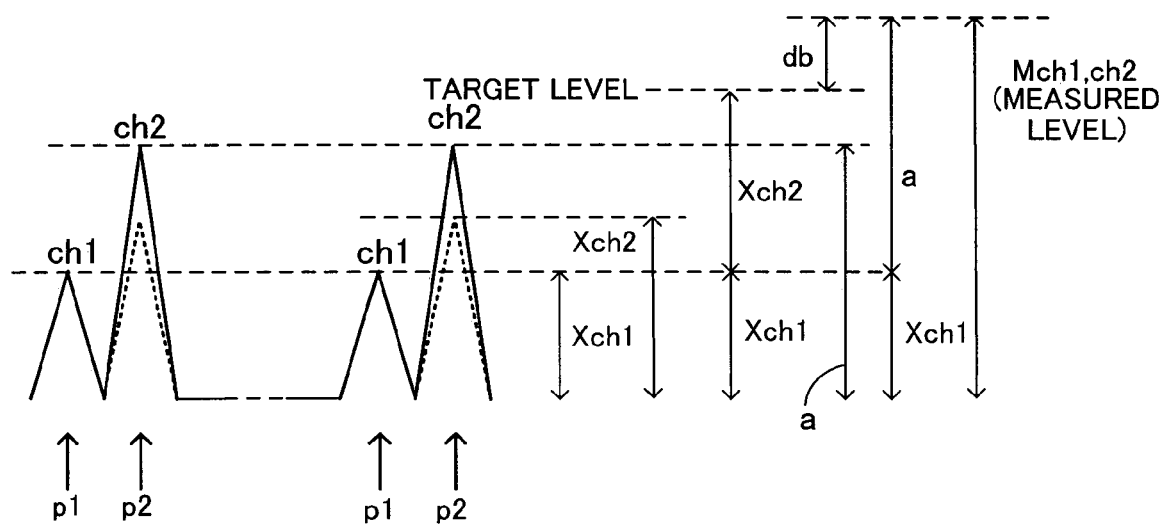
FIG. 10 is a second diagram illustrating an outline of operations of the optical switch device according to the second embodiment.

On the other hand, when the output level Mch1,ch2 monitored by the level monitoring unit 14 is higher than the level corresponding to Xch1+Xch2, the level monitoring unit 14 calculates a value db indicating the difference between each of the monitored levels Mch1,ch2 and Xch1+Xch2 (i.e., db=Mch1,ch2−(Xch1+Xch2)), and the control-light generator 15a corrects the initial level X2 of the optical control pulses for the channel ch2 so as to lower the initial level X2 and bring the value db closer to zero, and outputs optical control pulses p2 having the corrected level. FIG. 10 shows an outline of the operations performed by the optical switch device according to the second embodiment in the case where Mch1,ch2<Xch1+Xch2.

The levels of the optical control pulses p3 and p4 for use in excitation in the channels ch3 and ch4 are also set in similar manners to the levels of the optical control pulses p1 and p2.

Although the above operations of setting the levels of the optical control pulses (indicated in FIGS. 9 and 10) are performed on the basis of the peak levels of the optical pulses of the signal light, alternatively, it is possible to perform similar operations on the basis of the time-averaged levels of the optical pulses of the signal light.

Figure 11:
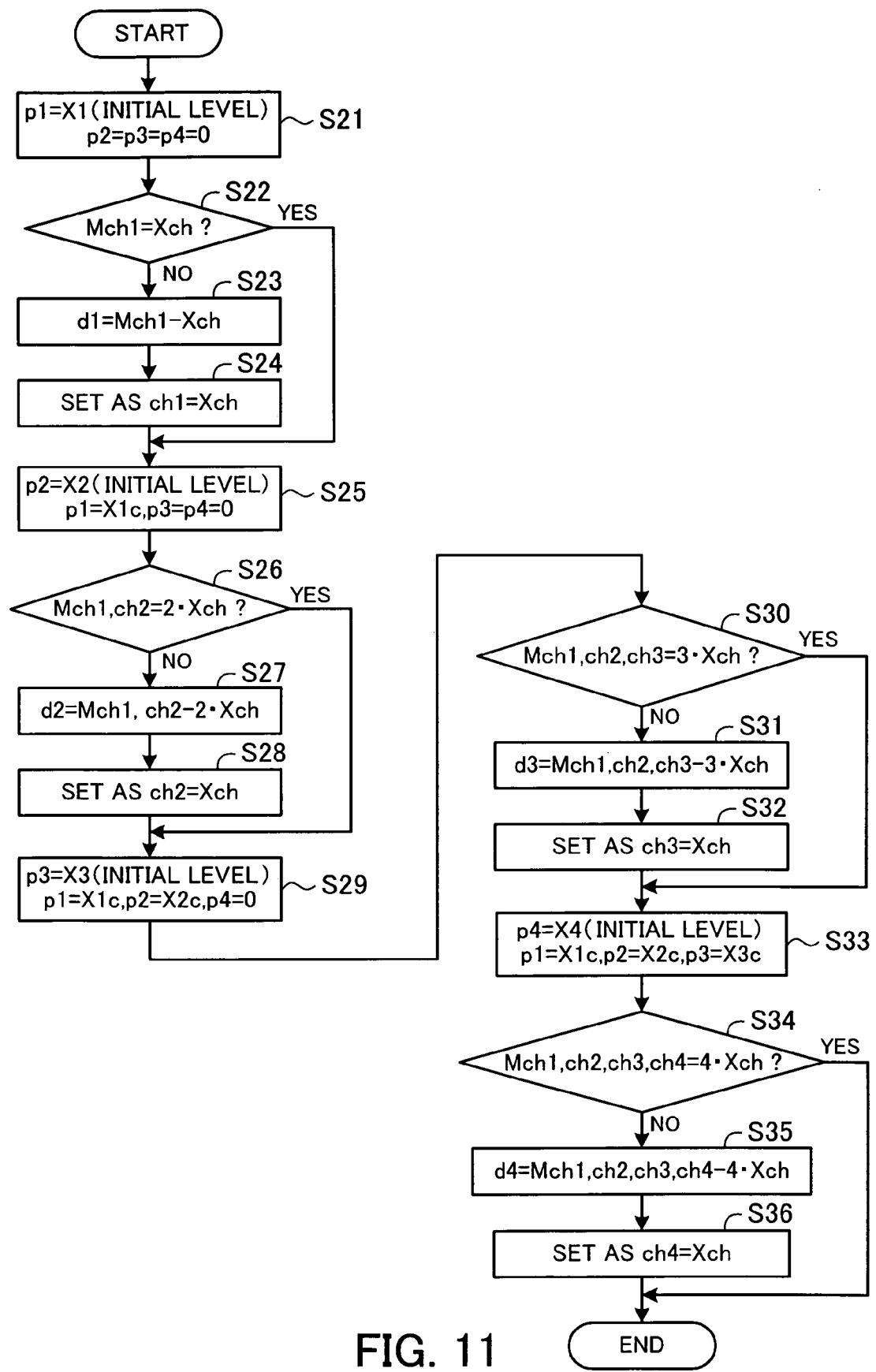
FIG. 11 is a flow diagram indicating a first exemplary sequence of operations of the optical switch device according to the second embodiment.

FIG. 11 is a flow diagram indicating a first exemplary sequence of operations of the optical switch device according to the second embodiment. In this example, it is assumed that the switch-output levels of the optical pulses of the signal light in all the channels ch1 to ch4 are set to identical levels Xch.

<S21> The control-light generator 15a generates optical control pulses p1 with their initial levels set to X1, and inputs the optical control pulses p1 into the HNLF 11 at the same timings as optical pulses of the signal light in the channel ch1. At this time, the levels of the optical control pulses p2 to p4 are set to zero.

<S22> The level monitoring unit 14 receives through the coupler C2 the optical pulses of the signal light in the channel ch1 outputted from the filter 16, performs opto-electric (O/E) conversion of the received optical pulses, and monitors the levels of the received optical pulses. When the monitored levels Mch1 are equal to a target level Xch of the optical pulses of the signal light in the channel ch1 (i.e., Mch1=Xch), the operation goes to step S25. Otherwise, the operation goes to step S23.

<S23> The level monitoring unit 14 calculates a value d1 indicating the difference between each of the monitored levels Mch1 and the target level Xch, and transfers the value d1 to the control-light setting unit 15.

<S24> The control-light generator 15a corrects the levels of the optical control pulses p1 to X1c so that the value d1 indicating the difference calculated in step S23 is brought close to zero, and the output levels of the optical pulses of the signal light in the channel ch1 are controlled at the level Xch.

<S25> The control-light generator 15a generates optical control pulses p2 with their initial levels set to X2, and inputs the optical control pulses p2 into the HNLF 11 at the same timings as optical pulses of the signal light in the channel ch2. At this time, the optical control pulses p1 having the level X1c as corrected in step S24 are also inputted into the HNLF 11. However, the levels of the optical control pulses p3 and p4 are set to zero.

<S26> The level monitoring unit 14 monitors the levels of the optical pulses outputted from the filter 16. When the monitored levels Mch1,ch2 are equal to a target level 2Xch (i.e., Mch1,ch2=2Xch), the operation goes to step S29. Otherwise, the operation goes to step S27.

<S27> The level monitoring unit 14 calculates a value d2 indicating the difference between each of the monitored levels Mch1,ch2 and the target level 2Xch, and transfers the value d2 to the control-light setting unit 15.

<S28> The control-light generator 15a corrects the levels of the optical control pulses p2 to X2c so that the value d2 indicating the difference calculated in step S27 is brought close to zero, and the output levels of the optical pulses of the signal light in the channel ch2 are controlled at the level Xch.

<S29> The control-light generator 15a generates optical control pulses p3 with their initial levels set to X3, and inputs the optical control pulses p3 into the HNLF 11 at the same timings as optical pulses of the signal light in the channel ch3. At this time, the optical control pulses p1 having the level X1c as corrected in step S24 and the optical control pulses p2 having the level X2c as corrected in step S28 are also inputted into the HNLF 11. However, the levels of the optical control pulses p4 are set to zero.

<S30> The level monitoring unit 14 monitors the levels of the optical pulses outputted from the filter 16. When the monitored levels Mch1,ch2,ch3 are equal to a target level 3Xch (i.e., Mch1,ch2,ch3=3Xch), the operation goes to step S33. Otherwise, the operation goes to step S31.

<S31> The level monitoring unit 14 calculates a value d3 indicating the difference between each of the monitored levels Mch1,ch2,ch3 and the target level 3Xch, and transfers the value d3 to the control-light setting unit 15.

<S32> The control-light generator 15a corrects the levels of the optical control pulses p3 to X3c so that the value d3 indicating the difference calculated in step S31 is brought close to zero, and the output levels of the optical pulses of the signal light in the channel ch3 are controlled at the level Xch.

<S33> The control-light generator 15a generates optical control pulses p4 with their initial levels set to X4, and inputs the optical control pulses p4 into the HNLF 11 at the same timings as optical pulses of the signal light in the channel ch4. At this time, the optical control pulses p1 having the level X1c as corrected in step S24, the optical control pulses p2 having the level X2c as corrected in step S28, and the optical control pulses p3 having the level X3c as corrected in step S32 are also inputted into the HNLF 11.

<S34> The level monitoring unit 14 monitors the levels of the optical pulses outputted from the filter 16. When the monitored levels Mch1,ch2,ch3,ch4 are equal to a target level 4Xch (i.e., Mch1,ch2,ch3,ch4=4Xch), the sequence of FIG. 11 is completed. Otherwise, the operation goes to step S35.

<S35> The level monitoring unit 14 calculates a value d4 indicating the difference between each of the monitored levels Mch1,ch2,ch3,ch4 and the target level 4Xch, and transfers the value d4 to the control-light setting unit 15.

<S36> The control-light generator 15a corrects the levels of the optical control pulses p4 to X4c so that the value d4 indicating the difference calculated in step S31 is brought close to zero, and the output levels of the optical pulses of the signal light in the channel ch4 are controlled at the level Xch.

Figure 12:
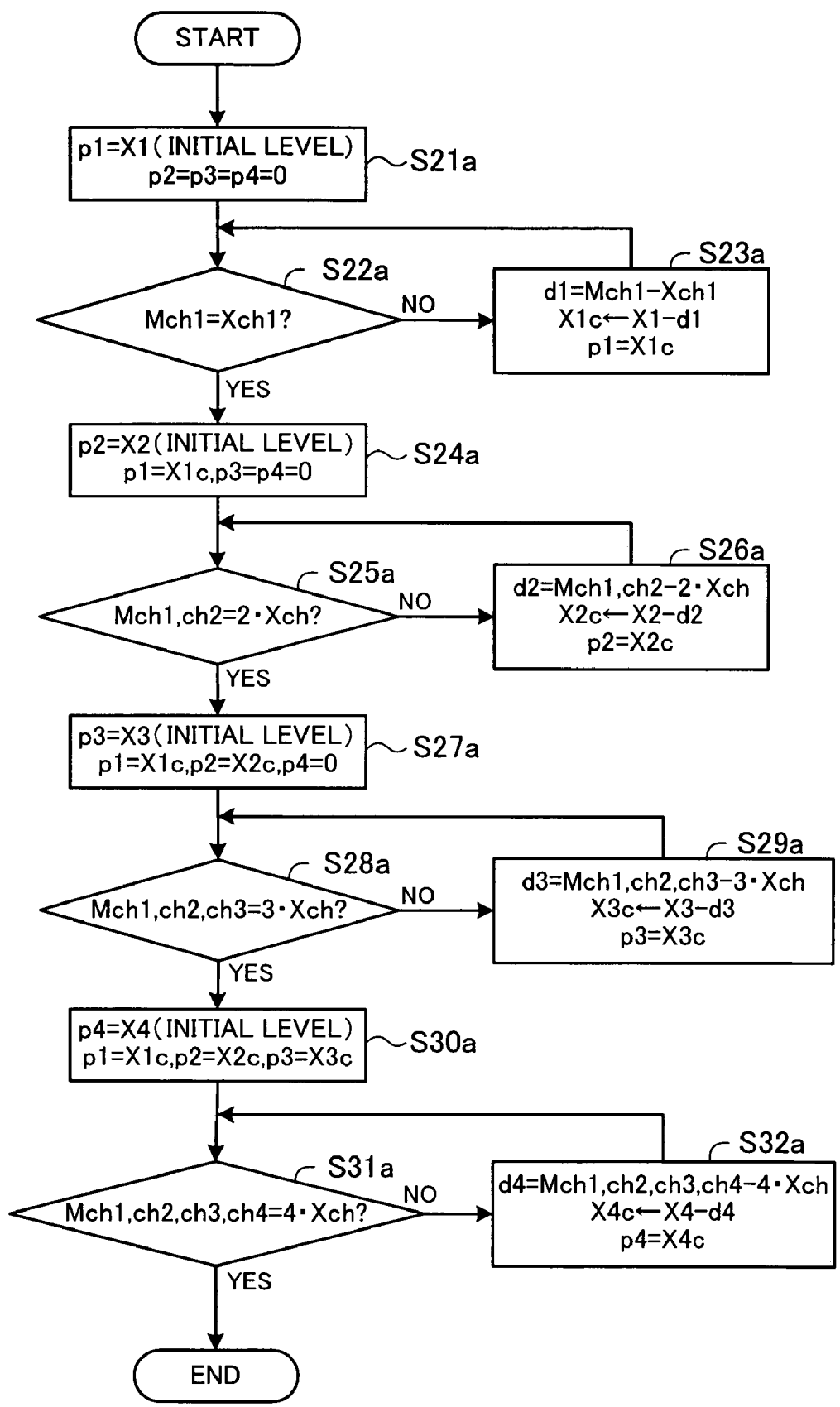
FIG. 12 is a flow diagram indicating a second exemplary sequence of operations of the optical switch device according to the second embodiment.

FIG. 12 is a flow diagram indicating a second exemplary sequence of operations of the optical switch device according to the second embodiment.

<S21a> The control-light generator 15a generates optical control pulses p1 with their initial levels set to X1, and inputs the optical control pulses p1 into the HNLF 11 at the same timing as optical pulses of the signal light in the channel ch1. At this time, the levels of the optical control pulses p2 to p4 are set to zero.

<S22a> The level monitoring unit 14 receives through the coupler C2 the optical pulses of the signal light in the channel ch1 outputted from the filter 16, performs opto-electric (O/E) conversion of the received optical pulses, and monitors the levels of the received optical pulses. When the monitored levels Mch1 are equal to a target level Xch (i.e., Mch1=Xch), the operation goes to step S24a. Otherwise, the operation goes to step S23a.

<S23a> The level monitoring unit 14 calculates a value d1 indicating the difference between each of the monitored levels Mch1 and the target level Xch, and transfers the value d1 to the control-light setting unit 15. The control-light generator 15a corrects the levels of the optical control pulses p1 to X1c so that the value d1 indicating the difference calculated by the level monitoring unit 14 becomes zero, and inputs new optical control pulses p1 having the corrected level X1c into the HNLF 11. Then, the operation goes to step S22a, and the correction is repeated until the monitored levels reach the target level Xch.

<S24a> The control-light generator 15a generates optical control pulses p2 with their initial levels set to X2, and inputs the optical control pulses p2 into the HNLF 11 at the same timings as optical pulses of the signal light in the channel ch2. At this time, the optical control pulses p1 having the level X1c as corrected in step S23a are also inputted into the HNLF 11. However, the levels of the optical control pulses p3 and p4 are set to zero.

<S25a> The level monitoring unit 14 monitors the levels of the optical pulses of the signal light in the channel ch2 outputted from the filter 16. When the monitored levels Mch1, ch2 are equal to a target level 2Xch (i.e., Mch1,ch2=2Xch), the operation goes to step S27a. Otherwise, the operation goes to step S26a.

<S26a> The level monitoring unit 14 calculates a value d2 indicating the difference between each of the monitored levels Mch1,ch2 and the target level 2Xch, and transfers the value d2 to the control-light setting unit 15. The control-light generator 15a corrects the levels of the optical control pulses p2 to X2c so that the value d2 indicating the difference calculated by the level monitoring unit 14 becomes zero, and inputs new optical control pulses p2 having the corrected level X2c into the HNLF 11. Then, the operation goes to step S25a, and the correction is repeated until the monitored levels reach the target level 2Xch.

<S27a> The control-light generator 15a generates optical control pulses p3 with their initial levels set to X3, and inputs the optical control pulses p3 into the HNLF 11 at the same timings as optical pulses of the signal light in the channel ch3. At this time, the optical control pulses p1 having the level X1c as corrected in step S23a and the optical control pulses p2 having the level X2c as corrected in step S26a are also inputted into the HNLF 11. However, the levels of the optical control pulses p4 are set to zero.

<S28a> The level monitoring unit 14 monitors the levels of the optical pulses of the signal light in the channel ch3 outputted from the filter 16. When the monitored levels Mch1, ch2,ch3 are equal to a target level 3Xch (i.e., Mch1,ch2, ch3=3Xch), the operation goes to step S30a. Otherwise, the operation goes to step S29a.

<S29a> The level monitoring unit 14 calculates a value d3 indicating the difference between each of the monitored levels Mch1,ch2,ch3 and the target level 3Xch, and transfers the value d3 to the control-light setting unit 15. The control-light generator 15a corrects the levels of the optical control pulses p3 to X3c so that the value d3 indicating the difference calculated by the level monitoring unit 14 becomes zero, and inputs new optical control pulses p3 having the corrected level X3c into the HNLF 11. Then, the operation goes to step S28a, and the correction is repeated until the monitored levels reach the target level 3Xch.

<S30a> The control-light generator 15a generates optical control pulses p4 with their initial levels set to X4, and inputs the optical control pulses p4 into the HNLF 11 at the same timings as optical pulses of the signal light in the channel ch4. At this time, the optical control pulses p1 having the level X1c as corrected in step S23a, the optical control pulses p2 having the level X2c as corrected in step S26a, and the optical control pulses p3 having the level X3c as corrected in step S29a are also inputted into the HNLF 11.

<S31a> The level monitoring unit 14 monitors the levels of the optical pulses of the signal light in the channel ch4 outputted from the filter 16. When the monitored levels Mch1, ch2,ch3,ch4 are equal to a target level 4Xch (i.e., Mch1,ch2, ch3,ch4=4Xch), the sequence of FIG. 12 is completed. Otherwise, the operation goes to step S32a.

<S32a> The level monitoring unit 14 calculates a value d4 indicating the difference between each of the monitored levels Mch1,ch2,ch3,ch4 and the target level 4Xch, and transfers the value d4 to the control-light setting unit 15. The control-light generator 15a corrects the levels of the optical control pulses p4 to X4c so that the value d4 indicating the difference calculated by the level monitoring unit 14 becomes zero, and inputs new optical control pulses p4 having the corrected level X4c into the HNLF 11. Then, the operation goes to step S31a, and the correction is repeated until the monitored levels reach the target level 4Xch.

In the first exemplary sequence of operations according to the second embodiment (explained with reference to FIG. 11), the levels of optical control pulses for each channel are corrected on the basis of the difference from the target level by only one operation. Therefore, the precision in the derivation of the corrected levels from each value indicating the difference determines the error from the target level. However, since the difference is determined only once for each channel, the processing speed in the first exemplary sequence is high. On the other hand, in the second exemplary sequence of operations according to the second embodiment (explained with reference to FIG. 12), the correction is repeated until the target level is reached. Therefore, according to the second exemplary sequence, the processing speed is low, although high precision in the derivation of the corrected levels from each value indicating the difference is not required.

Further, the first and second embodiments are effective in absorbing initial-level variations caused by the signal-path loss and the like which occur when the operation of the optical switch device 10 starts.

Hereinbelow, operations for controlling the levels of optical pulses outputted from the optical switch device according to the third embodiment are explained.

According to the third embodiment, a low-frequency signal is superimposed on optical control pulses so as to realize intensity modulation (amplitude modulation), and the intensity-modulated optical control pulses are inputted into the HNLF 11. Then, the levels of the optical control pulses for use in excitation in each channel are feedback controlled on the basis of the amplitude of a low-frequency signal superimposed on optical pulses which are intensity-modulated, switched, and outputted, so that the optical pulses outputted after switching are controlled at a desired level.

Figure 13:
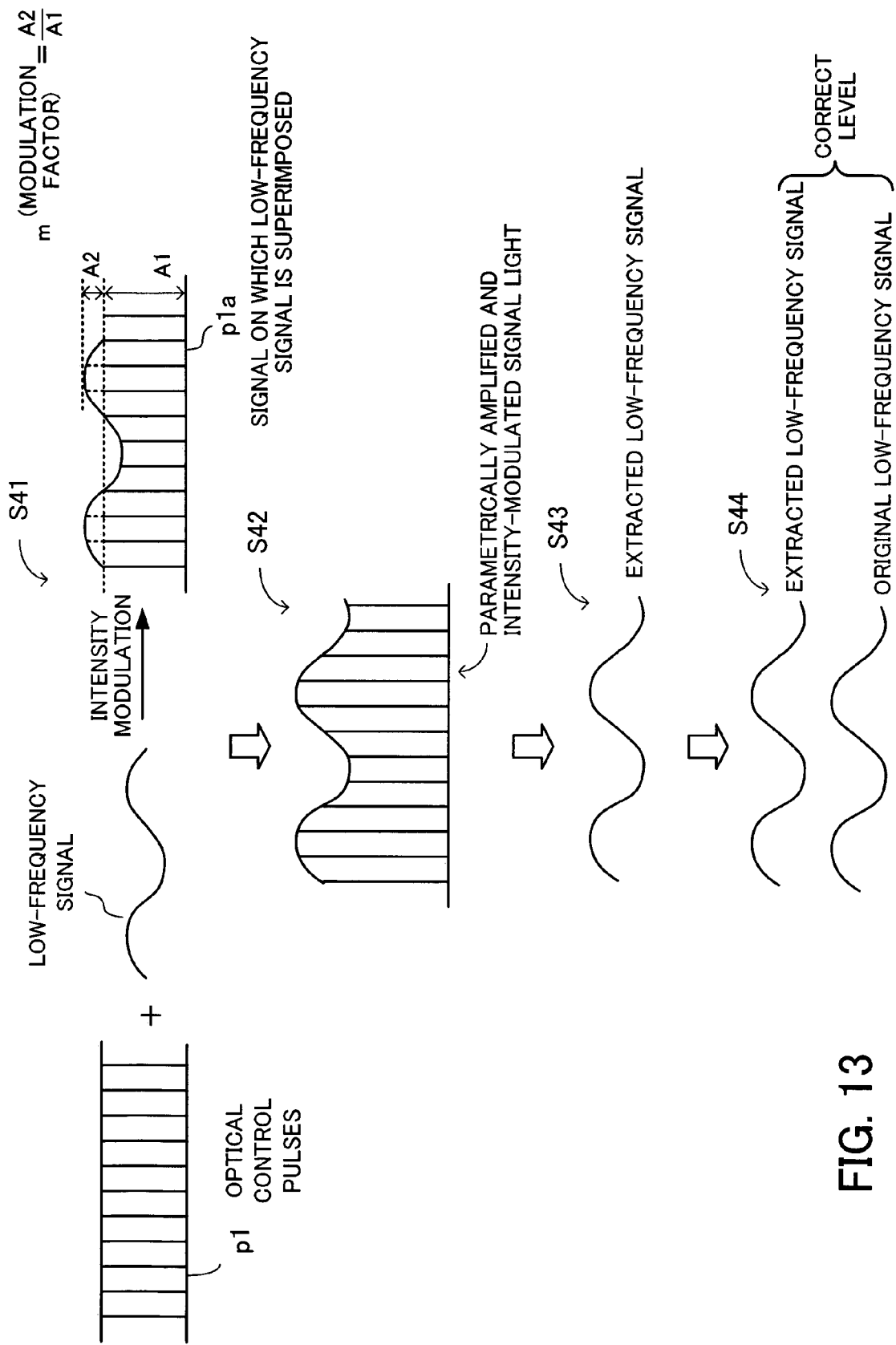
FIG. 13 is a diagram illustrating an outline of operations performed by an optical switch device according to a third embodiment of the present invention.

FIG. 13 is a diagram illustrating an outline of operations performed by the optical switch device according to the third embodiment of the present invention.

<S41> A superimposed signal p1a is generated by superimposing a low-frequency signal on optical control pulses p1, where the low-frequency signal belongs to a range of frequencies sufficiently lower than the frequency of the signal light. For example, in the case where the transmission rate of the signal light is 10 Gb/s or higher, the frequency of the low-frequency signal is as low as approximately 1 kHz. In addition, when the amplitude of the optical control pulses p1 is indicated by A1, and the amplitude of the low-frequency signal is indicated by A2, the modulation factor m (i.e., the amplitude ratio between the carrier wave and the signal wave) is expressed as m=A2/A1. That is, the intensity-modulation by the modulation factor m is performed.

<S42> The signal light is intensity-modulated and parametrically amplified, and is then outputted as a switch output.

<S43> The level monitoring unit 14 receives the signal light switched and outputted as above, performs opto-electric (O/E) conversion of the received signal light, extracts a low-frequency signal, and monitors the amplitude of the extracted low-frequency signal.

<S44> The control-light generator 15a corrects the levels of the optical control pulses while maintaining the modulation factor so that the amplitude of the extracted low-frequency signal is controlled at a target level.

Next, exemplary sequences of operations of the optical switch device according to the third embodiment are explained below.

Figure 14:
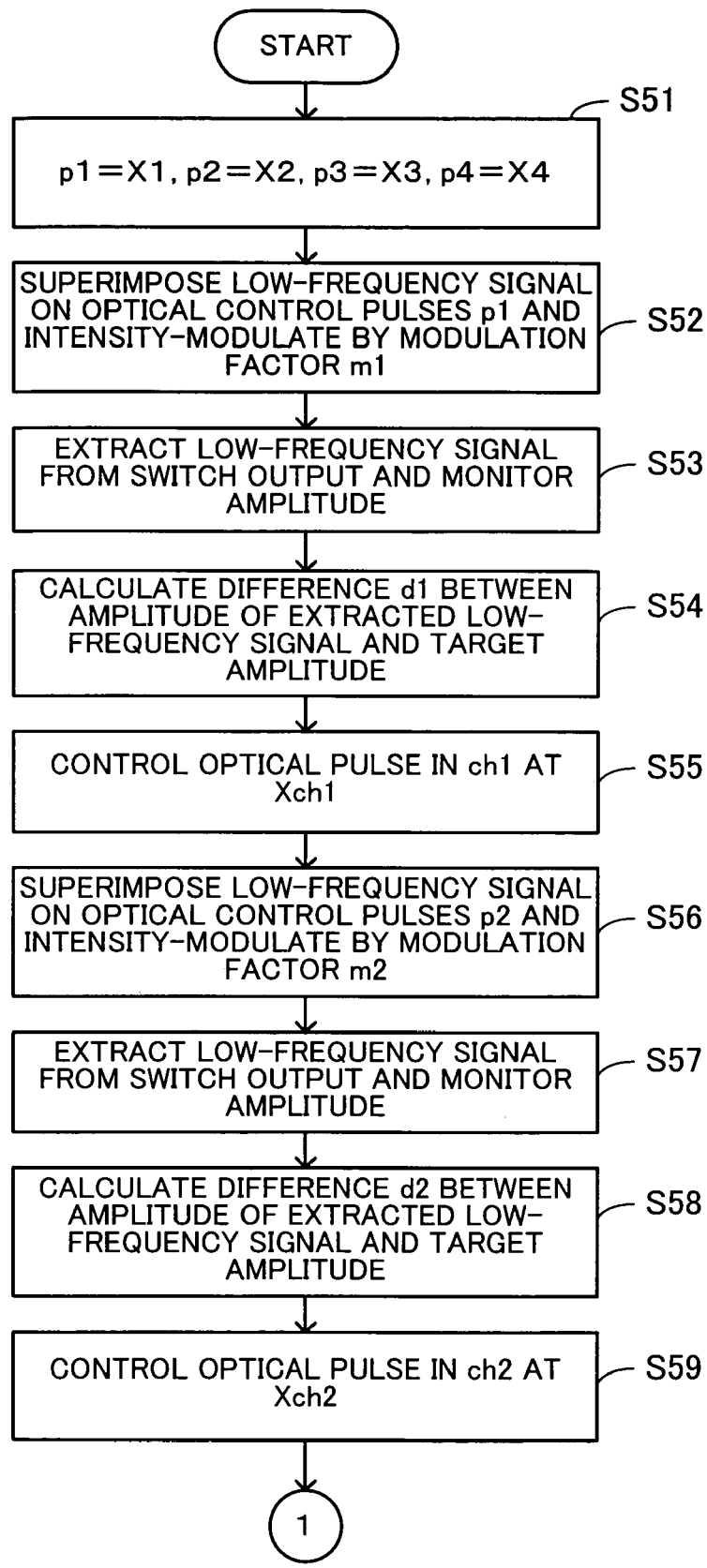
FIGS. 14 and 15 are flow diagrams indicating a first exemplary sequence of operations of the optical switch device according to the third embodiment.
Figure 15:
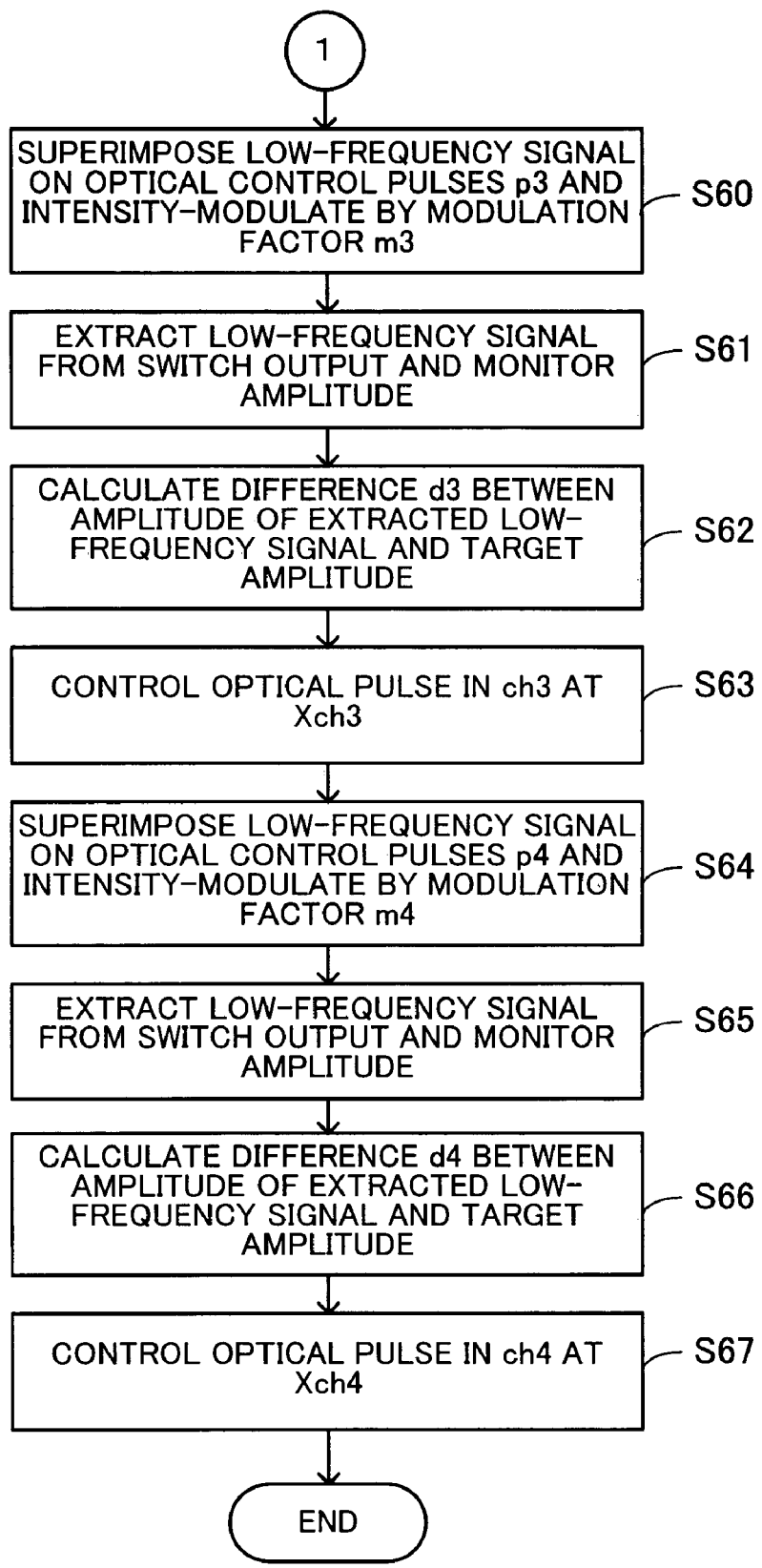

FIGS. 14 and 15 are flow diagrams indicating a first exemplary sequence of operations of the optical switch device according to the third embodiment. In this example, the target levels of switched optical pulses of the signal light in the channels ch1 to ch4 are assumed to be Xch1 to Xch4.

<S51> The control-light generator 15a sets the initial levels of optical control-pulses p1 to p4, to X1 to X4, respectively.

<S52> The control-light generator 15a superimposes a low-frequency signal having a fixed amplitude on the optical control pulses p1 having the amplitude X1 so as to intensity-modulate the optical control pulses p1 by the modulation factor m1, and inputs the intensity-modulated optical control pulses p1 into the HNLF 11 at the same timings as optical pulses of the signal light in the channel ch1.

<S53> The level monitoring unit 14 receives through the coupler C2 the optical pulses of the signal light in the channel ch1 outputted from the filter 16, performs opto-electric (O/E) conversion of the received optical pulses, extracts a low-frequency signal in the channel ch1, and monitors the amplitude of the extracted low-frequency signal.

<S54> The level monitoring unit 14 calculates a value d1 indicating the difference between the amplitude of the extracted low-frequency signal in the channel ch1 and a corresponding target amplitude, and transfers the value d1 to the control-light setting unit 15.

<S55> The control-light generator 15a corrects the levels of the optical control pulses p1 by variably setting the levels of the optical control pulses p1 while maintaining the modulation factor m1 so that the value d1 indicating the difference calculated by the level monitoring unit 14 becomes zero, and the output levels of the optical pulses of the signal light in the channel ch1 are controlled at the level Xch1.

<S56> The control-light generator 15a superimposes a low-frequency signal having a fixed amplitude on the optical control pulses p2 having the amplitude X2 so as to intensity-modulate the optical control pulses p2 by the modulation factor m2, and inputs the intensity-modulated optical control pulses p2 into the HNLF 11 at the same timings as optical pulses of the signal light in the channel ch2.

<S57> The level monitoring unit 14 receives through the coupler C2 the optical pulses of the signal light in the channel ch2 outputted from the filter 16, performs O/E conversion of the received optical pulses, extracts a low-frequency signal in the channel ch2, and monitors the amplitude of the extracted low-frequency signal.

<S58> The level monitoring unit 14 calculates a value d2 indicating the difference between the amplitude of the extracted low-frequency signal in the channel ch2 and a corresponding target amplitude, and transfers the value d2 to the control-light setting unit 15.

<S59> The control-light generator 15a corrects the levels of the optical control pulses p2 by variably setting the levels of the optical control pulses p2 while maintaining the modulation factor m2 so that the value d2 indicating the difference calculated by the level monitoring unit 14 becomes zero, and the output levels of the optical pulses of the signal light in the channel ch2 are controlled at the level Xch2.

<S60> The control-light generator 15a superimposes a low-frequency signal having a fixed amplitude on the optical control pulses p3 having the amplitude X3 so as to intensity-modulate the optical control pulses p3 by the modulation factor m3, and inputs the intensity-modulated optical control pulses p3 into the HNLF 11 at the same timings as optical pulses of the signal light in the channel ch3.

<S61> The level monitoring unit 14 receives through the coupler C2 the optical pulses of the signal light in the channel ch3 outputted from the filter 16, performs O/E conversion of the received optical pulses, extracts a low-frequency signal in the channel ch3, and monitors the amplitude of the extracted low-frequency signal.

<S62> The level monitoring unit 14 calculates a value d3 indicating the difference between the amplitude of the extracted low-frequency signal in the channel ch3 and a corresponding target amplitude, and transfers the value d3 to the control-light setting unit 15.

<S63> The control-light generator 15a corrects the levels of the optical control pulses p3 by variably setting the levels of the optical control pulses p3 while maintaining the modulation factor m3 so that the value d3 indicating the difference calculated by the level monitoring unit 14 becomes zero, and the output levels of the optical pulses of the signal light in the channel ch3 are controlled at the level Xch3.

<S64> The control-light generator 15a superimposes a low-frequency signal having a fixed amplitude on the optical control pulses p4 having the amplitude X4 so as to intensity-modulate the optical control pulses p4 by the modulation factor m4, and inputs the intensity-modulated optical control pulses p4 into the HNLF 11 at the same timings as optical pulses of the signal light in the channel ch4.

<S65> The level monitoring unit 14 receives through the coupler C2 the optical pulses of the signal light in the channel ch4 outputted from the filter 16, performs O/E conversion of the received optical pulses, extracts a low-frequency signal in the channel ch4, and monitors the amplitude of the extracted low-frequency signal.

<S66> The level monitoring unit 14 calculates a value d4 indicating the difference between the amplitude of the extracted low-frequency signal in the channel ch4 and a corresponding target amplitude, and transfers the value d4 to the control-light setting unit 15.

<S67> The control-light generator 15a corrects the levels of the optical control pulses p4 by variably setting the levels of the optical control pulses p4 while maintaining the modulation factor m4 so that the value d4 indicating the difference calculated by the level monitoring unit 14 becomes zero, and the output levels of the optical pulses of the signal light in the channel ch4 are controlled at the level Xch4.

Figure 16:
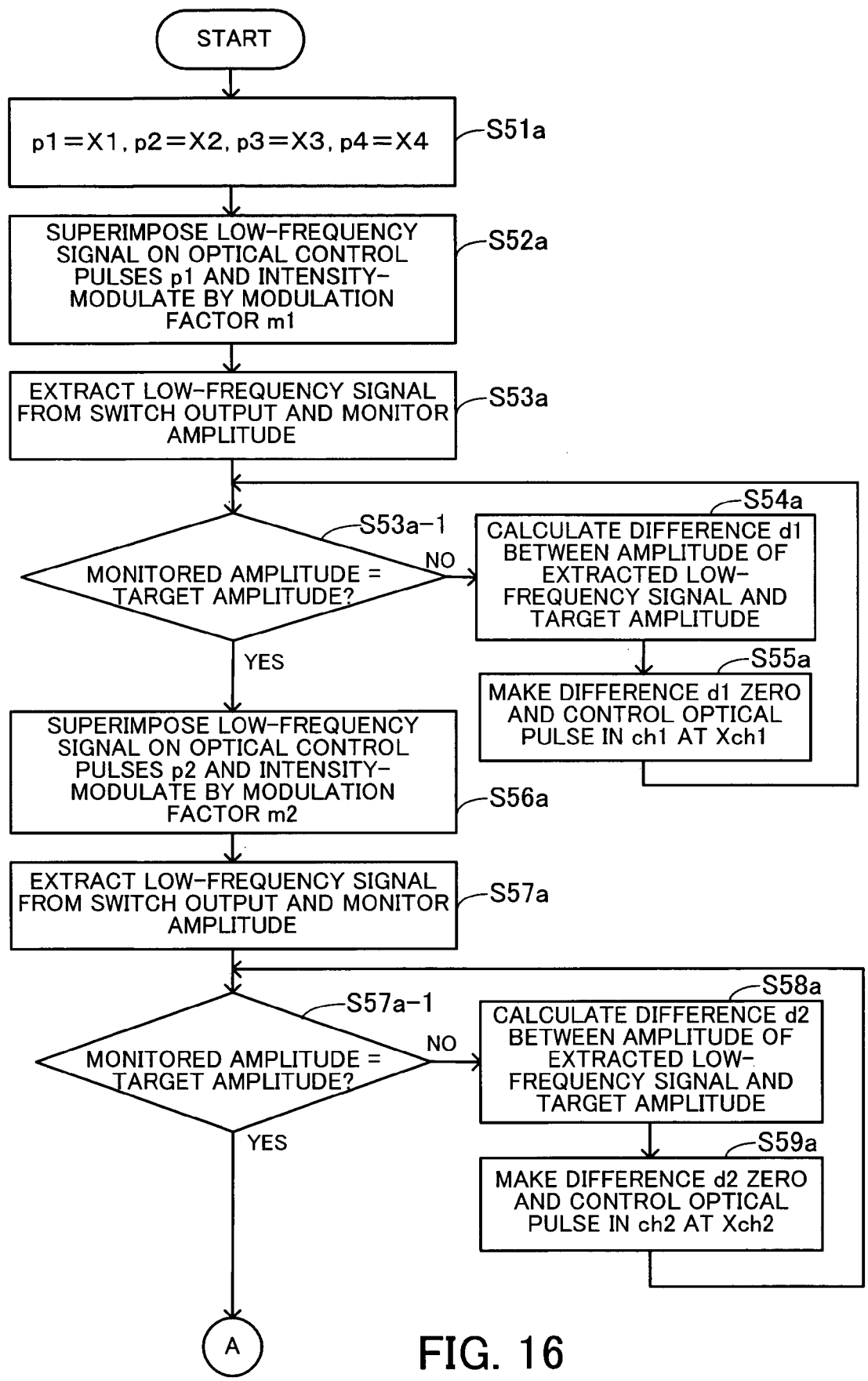
FIGS. 16 and 17 are flow diagrams indicating a second exemplary sequence of operations of the optical switch device according to the third embodiment.
Figure 17:
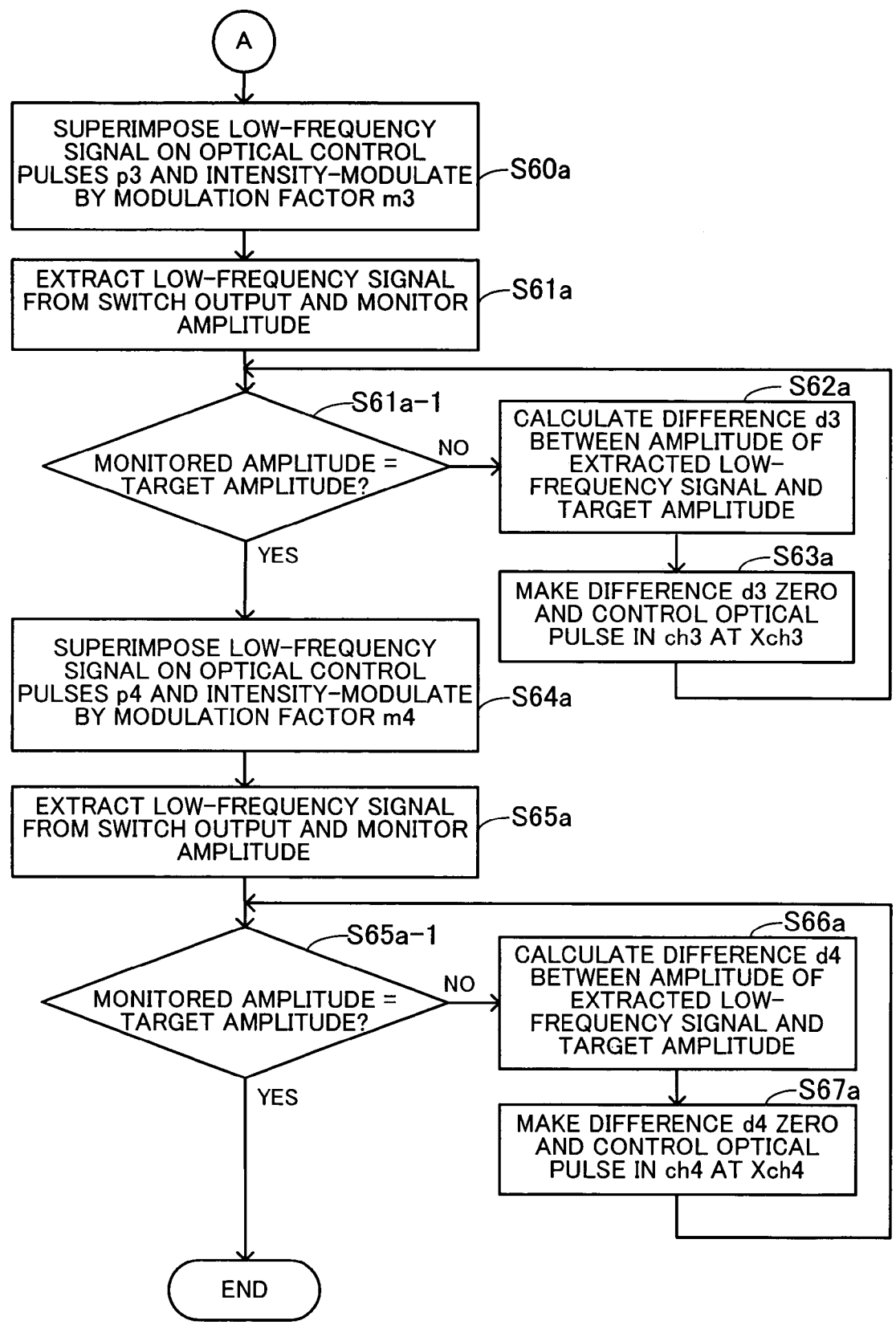

FIGS. 16 and 17 are flow diagrams indicating a second exemplary sequence of operations of the optical switch device according to the third embodiment.

<S51a> The control-light generator 15a sets the initial levels of optical control pulses p1 to p4, to X1 to X4, respectively.

<S52a> The control-light generator 15a superimposes a low-frequency signal having a fixed amplitude on the optical control pulses p1 having the amplitude X1 so as to intensity-modulate the optical control pulses p1 by the modulation factor m1, and inputs the intensity-modulated optical control pulses p1 into the HNLF 11 at the same timings as optical pulses of the signal light in the channel ch1.

<S53a> The level monitoring unit 14 receives through the coupler C2 the optical pulses of the signal light in the channel ch1 outputted from the filter 16, performs opto-electric (O/E) conversion of the received optical pulses, extracts a low-frequency signal in the channel ch1, and monitors the amplitude of the extracted low-frequency signal.

<S53a-1> The level monitoring unit 14 compares the monitored amplitude of the extracted low-frequency signal in the channel ch1 with a corresponding target amplitude. When the monitored amplitude is equal to the corresponding target amplitude, the operation goes to step S56a. Otherwise, the operation goes to step S54a.

<S54a> The level monitoring unit 14 calculates a value d1 indicating the difference between the amplitude of the extracted low-frequency signal in the channel ch1 and the corresponding target amplitude, and transfers the value d1 to the control-light setting unit 15.

<S55a> The control-light generator 15a corrects the levels of the optical control pulses p1 by variably setting the levels of the optical control pulses p1 while maintaining the modulation factor m1 so that the value d1 indicating the difference calculated by the level monitoring unit 14 becomes zero, and the output levels of the optical pulses of the signal light in the channel ch1 are controlled at the level Xch1. Thereafter, the operation goes to step S53a-1.

<S56a> The control-light generator 15a superimposes a low-frequency signal having a fixed amplitude on the optical control pulses p2 having the amplitude X2 so as to intensity-modulate the optical control pulses p2 by the modulation factor m2, and inputs the intensity-modulated optical control pulses p2 into the HNLF 11 at the same timings as optical pulses of the signal light in the channel ch2.

<S57a> The level monitoring unit 14 receives through the coupler C2 the optical pulses of the signal light in the channel ch2 outputted from the filter 16, performs O/E conversion of the received optical pulses, extracts a low-frequency signal in the channel ch2, and monitors the amplitude of the extracted low-frequency signal.

<S57a-1> The level monitoring unit 14 compares the monitored amplitude of the extracted low-frequency signal in the channel ch2 with a corresponding target amplitude. When the monitored amplitude is equal to the corresponding target amplitude, the operation goes to step S60a. Otherwise, the operation goes to step S58a.

<S58a> The level monitoring unit 14 calculates a value d2 indicating the difference between the amplitude of the extracted low-frequency signal in the channel ch2 and the corresponding target amplitude, and transfers the value d2 to the control-light setting unit 15.

<S59a> The control-light generator 15a corrects the levels of the optical control pulses p2 by variably setting the levels of the optical control pulses p2 while maintaining the modulation factor m2 so that the value d2 indicating the difference calculated by the level monitoring unit 14 becomes zero, and the output levels of the optical pulses of the signal light in the channel ch2 are controlled at the level Xch2. Thereafter, the operation goes to step S57a-1.

<S60a> The control-light generator 15a superimposes a low-frequency signal having a fixed amplitude on the optical control pulses p3 having the amplitude X3 so as to intensity-modulate the optical control pulses p3 by the modulation factor m3, and inputs the intensity-modulated optical control pulses p3 into the HNLF 11 at the same timings as optical pulses of the signal light in the channel ch3.

<S61a> The level monitoring unit 14 receives through the coupler C2 the optical pulses of the signal light in the channel ch3 outputted from the filter 16, performs O/E conversion of the received optical pulses, extracts a low-frequency signal, and monitors the amplitude of the extracted low-frequency signal.

<S61a-1> The level monitoring unit 14 compares the monitored amplitude of the extracted low-frequency signal in the channel ch3 with a corresponding target amplitude. When the monitored amplitude is equal to the corresponding target amplitude, the operation goes to step S64a. Otherwise, the operation goes to step S62a.

<S62a> The level monitoring unit 14 calculates a value d3 indicating the difference between the amplitude of the extracted low-frequency signal in the channel ch3 and the corresponding target amplitude, and transfers the value d3 to the control-light setting unit 15.

<S63a> The control-light generator 15a corrects the levels of the optical control pulses p3 by variably setting the levels of the optical control pulses p3 while maintaining the modulation factor m3 so that the value d3 indicating the difference calculated by the level monitoring unit 14 becomes zero, and the output levels of the optical pulses of the signal light in the channel ch3 are controlled at the level Xch3. Thereafter, the operation goes to step S61a-1.

<S64a> The control-light generator 15a superimposes a low-frequency signal having a fixed amplitude on the optical control pulses p4 having the amplitude X4 so as to intensity-modulate the optical control pulses p4 by the modulation factor m4, and inputs the intensity-modulated optical control pulses p4 into the HNLF 11 at the same timings as optical pulses of the signal light in the channel ch4.

<S65a> The level monitoring unit 14 receives through the coupler C2 the optical pulses of the signal light in the channel ch4 outputted from the filter 16, performs O/E conversion of the received optical pulses, extracts a low-frequency signal, and monitors the amplitude of the extracted low-frequency signal.

<S65a-1> The level monitoring unit 14 compares the monitored amplitude of the extracted low-frequency signal in the channel ch2 with a corresponding target amplitude. When the monitored amplitude is not equal to the corresponding target amplitude, the operation goes to step S66a.

<S66a> The level monitoring unit 14 calculates a value d4 indicating the difference between the amplitude of the extracted low-frequency signal in the channel ch4 and the corresponding target amplitude, and transfers the value d4 to the control-light setting unit 15.

<S67a> The control-light generator 15a corrects the levels of the optical control pulses p4 by variably setting the levels of the optical control pulses p4 while maintaining the modulation factor m4 so that the value d4 indicating the difference calculated by the level monitoring unit 14 becomes zero, and the output levels of the optical pulses of the signal light in the channel ch4 are controlled at the level Xch4. Thereafter, the operation goes to step S65a-1.

According to the third embodiment, it is possible to absorb initial-level variations caused by the signal-path loss and the like which occur when the operation of the optical switch device 10 starts, and effectively absorb signal-loss variations caused by environmental variations during operation after signals become effective, and level variations which are caused at the times a portion of signal paths is switched or at other times.

Although, in the above example, the low-frequency signals having an identical frequency are superimposed on the optical control pulses for all the channels, alternatively, it is possible to superimpose a low-frequency signal having a different frequency on optical control pulses for each channel, extract a component having each frequency from the monitored optical output, and correct the levels of optical control pulses for each channel.

In the first to third embodiments, the level monitoring unit 14 does not monitor the switch-output level of each fast optical pulse separately, and instead averagely monitors the levels of the output pulses of the optical switch device. For example, when the output levels in the channel ch1 are monitored in the first embodiment, signals in the channels ch2 to ch4 are in the OFF state, and therefore it is possible to monitor substantially only the output levels in the channel ch1 by averagely monitoring the levels of output pulses of the optical switch device.

Similarly, in each of the second and third embodiments, the levels of the output pulses of the optical switch device are averagely monitored.

Since it is sufficient that the level monitoring unit 14 monitors time-averaged levels of output pulses of the optical switch device over the entire pulse widths, the normal photodiodes (PDs) can be used for monitoring the output levels. For example, it is possible to monitor the output levels of the optical switch device by using a PD in a bandwidth (e.g., 10 kHz) sufficiently lower than the signal bit rate (e.g., 40 Gb/s). Even if an attempt is made to separately monitor the output level of each fast optical pulse by using a PD, the PD cannot follow each fast optical pulse, and cannot definitely detect the intensity of the optical pulse.

Next, the fourth embodiment of the present invention is explained below.

According to the first to third embodiments, the level monitoring unit 14 monitors the levels of the optical pulses outputted from the optical switch device, and the control-light generator 15a performs feedback control by variably setting the levels of the optical control pulses on the basis of the monitoring result. However, according to the fourth embodiment, the control-light polarization controller 15b corrects the levels of optical pulses outputted from the optical switch device, by varying the angle between the polarization directions of signal light and each optical control pulse (at the input stage), as well as the excitation level of each optical control pulse, although, in the first to third embodiments, the angle between the polarization directions of signal light and each optical control pulse (at the input stage) is fixed at 45 degrees.

In the construction of FIG. 5, only the vertical component of the signal light parametrically amplified in the HNLF 11 passes through the polarizer 13. Therefore, the output level of the optical switch device can be varied by changing the angle between the polarization directions of signal light and each optical control pulse (at the input stage).

Experiments and simulations show that it is preferable to set the angle between the polarization directions of signal light and each optical control pulse (at the input stage) within the range of 40 to 50 degrees. When the above angle is too great, the polarization direction of the signal light is hard to rotate. On the other hand, when the above angle is too small, too much loss occurs in the HNLF 11.

When the variable setting of the excitation level of each optical control pulse and the variable setting of the angle between the polarization directions of signal light and each optical control pulse (at the input stage) are combined, it is possible to finely control the levels of the optical pulses outputted from the optical switch device.

Generation of Optical Control Pulse

Hereinbelow, operations of generating optical control pulses by the control-light setting unit 15 are explained.

In the case where the control-light generator 15a generates optical control pulses so that the optical pulses of the signal light in all the channels outputted from the optical switch device are controlled at identical levels, it is unnecessary to identify each channel when the optical control pulses are generated. In this case, it is sufficient that each optical control pulse correspond to one of the channels, and it is unnecessary that the number indicating each optical control pulse be identical to the number indicating a channel corresponding to the optical control pulse. For example, an optical control pulse p3 may correspond to the channel ch1.

Figure 18:
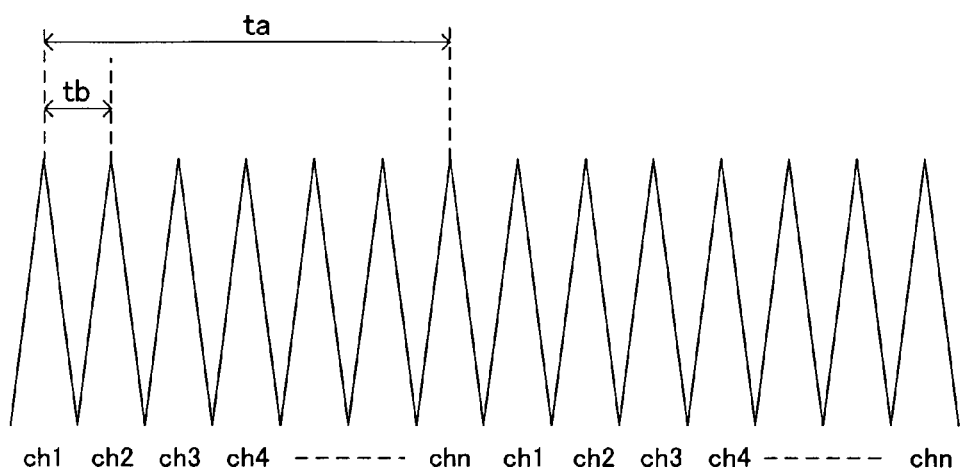
FIG. 18 is a diagram indicating a channel period and a channel gap.

In order to generate optical control pulses, the control-light setting unit 15 is required to be informed of the channel period and the number of channels. Therefore, information indicating the channel period (ta) and the number of channels (n) is supplied to the control-light setting unit 15. Alternatively, the channel gap (tb), instead of the number of channels (n), may be supplied to the control-light setting unit 15. FIG. 18 shows examples of the channel period and the channel gap.

In addition, in order to synchronize an optical control pulse with an optical pulse propagating as the signal light, the controller 15c in the control-light setting unit 15 extracts a clock signal from the signal light, and regenerates the clock signal by using a PLL (phase-locked loop) circuit or the like. Then, the optical control pulse is generated in synchronization with the regenerated clock signal, so that the optical control pulse can be synchronized with the optical pulse of the signal light. Alternatively, in the case where the clock signal is not extracted from the signal light, it is necessary to provide a clock-pulse generator in the controller 15c.

Figure 19:
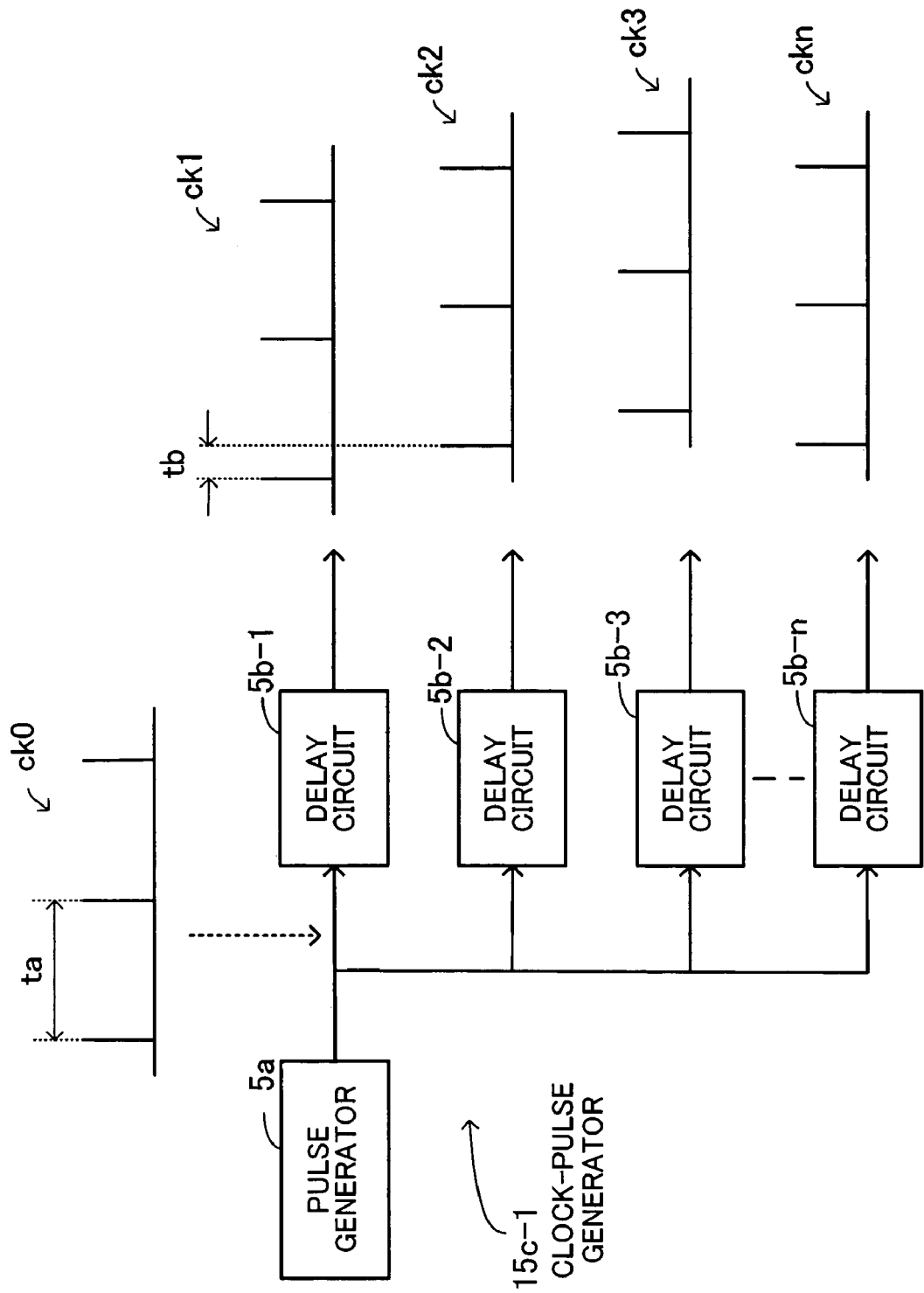
FIG. 19 is a diagram illustrating a clock-pulse generator.
Figure 20:
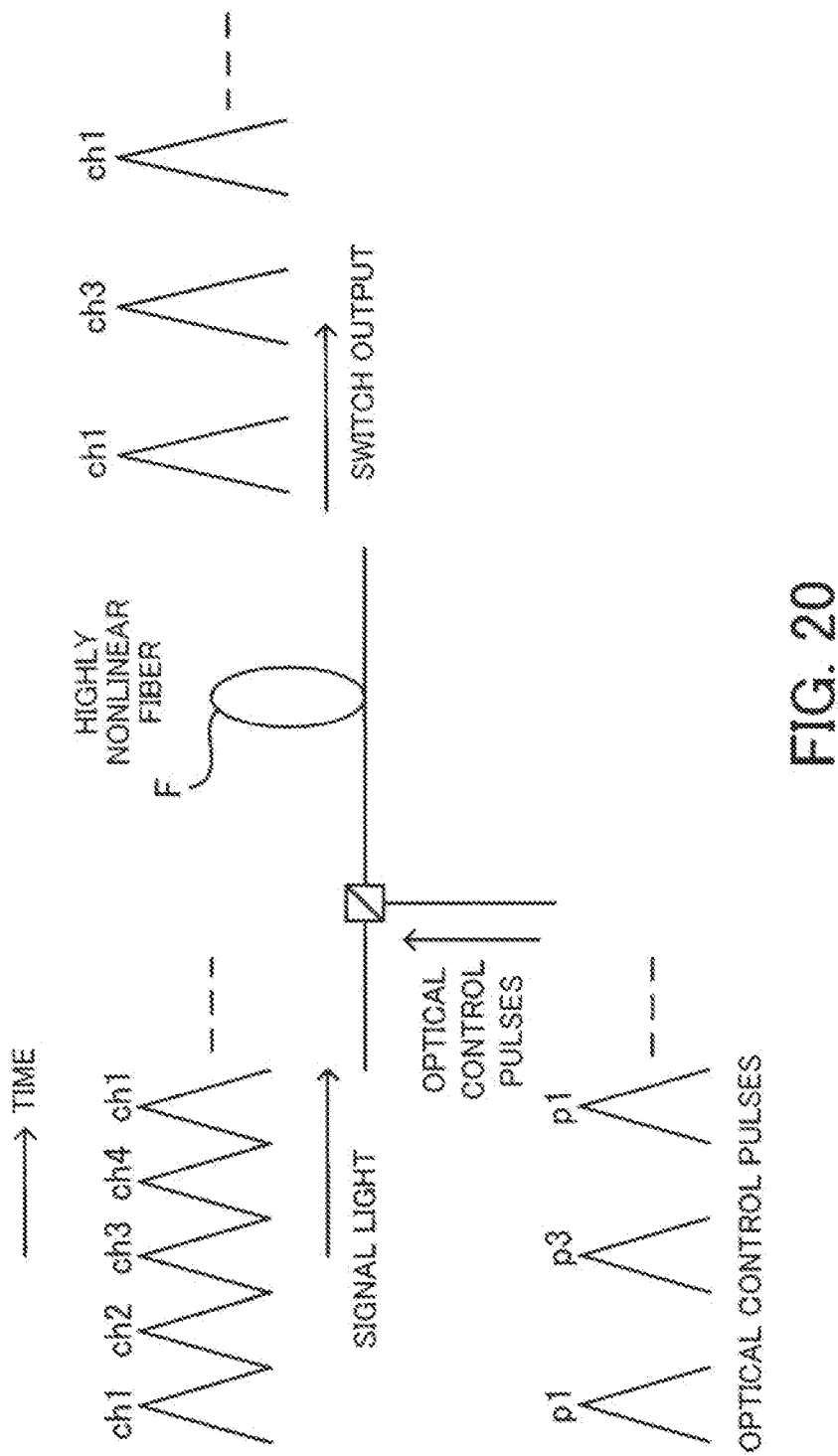
FIG. 20 is a diagram illustrating an outline of operations of optical switching by use of the parametric amplification.
Figure 21:
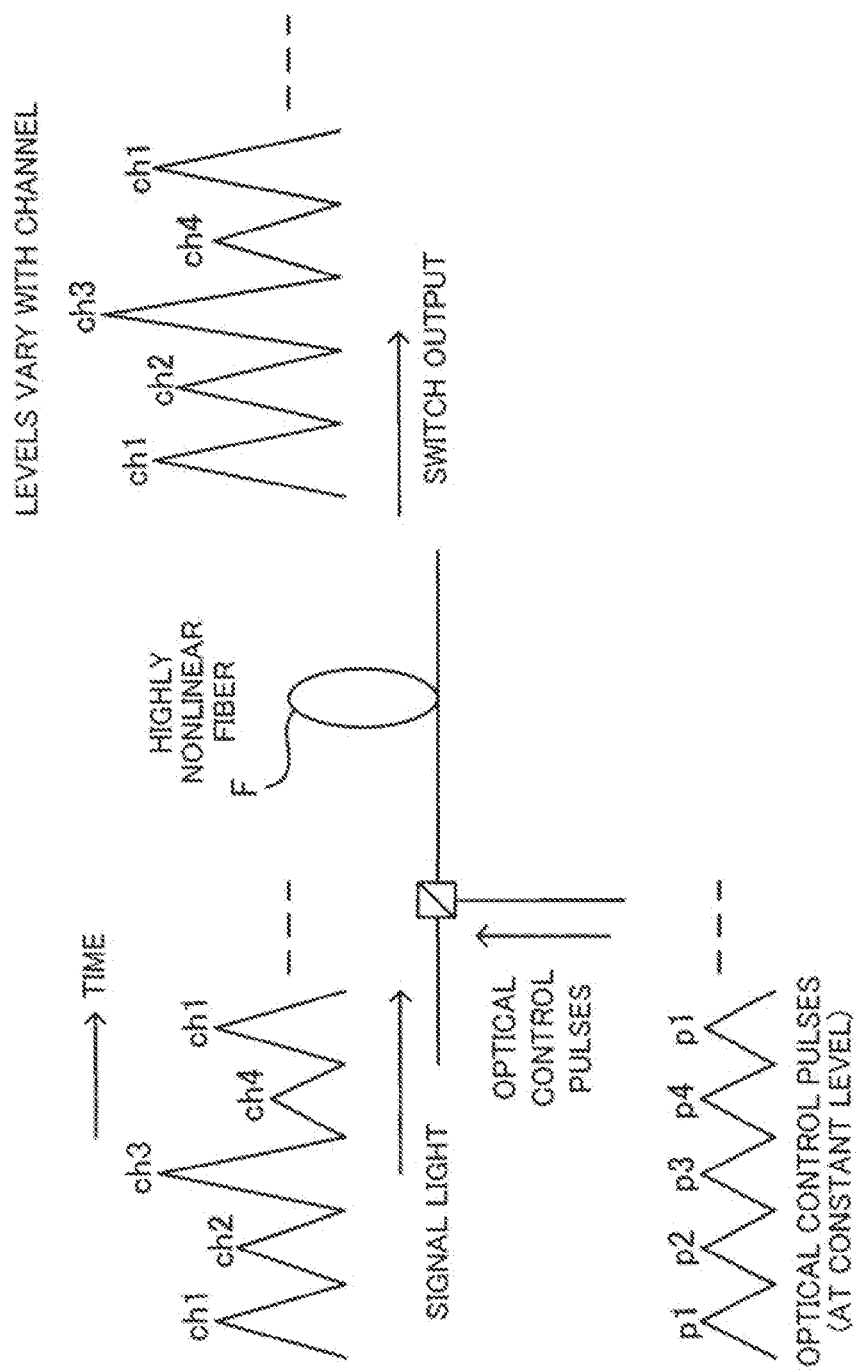
FIG. 21 is a diagram provided for explaining the problems in the conventional optical switching.

FIG. 19 shows a construction of a clock-pulse generator, which is provided in the optical switch device in the case where no clock signal is extracted from the signal light. The clock-pulse generator generates a clock signal which synchronizes with optical pulses of the signal light.

The clock-pulse generator 15c-1 comprises a pulse generator 5a and delay circuits 5b-1 to 5b-n, where n is the number of the channels. When information indicating the channel period ta is externally supplied to the pulse generator 5a, the pulse generator 5a generates a clock signal ck0 constituted by clock pulses arranged at intervals corresponding to the channel period ta. The clock signal ck0 outputted from the pulse generator 5a is not in phase with the timings of the channels in the signal light.

The delay circuit 5b-1 receives the clock signal ck0, delays (shifts) the phase of the clock signal ck0, and outputs the phase-shifted clock signal as a clock signal ck1. The control-light generator 15a generates optical control pulses in synchronization with the clock signal ck1, and inputs the generated optical control pulses into the HNLF 11.

The controller 15c varies the amount of delay caused by the delay circuit 5b-1, and acquires from the level monitoring unit 14 the optical output levels corresponding to the optical control pulses which synchronize with the clock signal ck1. Then, the amount of delay DL1 which is caused by the delay circuit 5b-1 and maximizes the optical output levels (or makes the optical output levels coincide with a predetermined level) is determined to be set in the delay circuit 5b-1. Thus, when the above amount of delay DL1 is set in the delay circuit 5b-1, the clock signal ck1 synchronizes with optical pulses of the signal light in one of the channels in the signal light. After the amount of delay DL1 for the delay circuit 5b-1 is obtained, the amount of delay DL2 which is to be set in the delay circuit 5b-2 can be determined by adding the channel gap tb to the amount of delay DL1. Then, the delay circuit 5b-2 outputs a clock signal ck2, which is delayed from the clock signal ck0 by the amount of delay DL2. Similarly, the amount of delay DLm to be set in each delay circuit 5b-m can be determined in accordance with the following equation.

$$DLm=DL1+(m-1)\times tb(1\leq m\leq n)$$

Thus, when optical control pulses are generated in synchronization with each of the clock signals ck1, ck2, . . . ckn, the optical control pulses synchronize with one of the channels in the signal light.

Alternatively, in the case where a clock signal constituted by clock pulses arranged at intervals of the channel gap tb, instead of the information indicating the channel period ta, is externally supplied to the pulse generator 5a, the pulse generator 5a generates a clock signal ck0 constituted by clock pulses arranged at intervals corresponding to the channel period ta, by frequency-dividing the clock signal supplied thereto by n, and outputs the generated clock signal ck0.

Channel Identification

Hereinbelow, operations of identifying each channel of optical pulses propagating as the signal light are explained.

In the case where the control-light generator 15a generates optical control pulses so that optical pulses of the signal light in the respective channels outputted from the optical switch device are controlled at different levels, it is necessary to identify the channels. In this case, each channel can be identified on either of the transmitter side and the receiver side. For example, the optical switch device can identify each channel when a transmitter attaches identification information to the signal light. Alternatively, the optical switch device can identify each channel on the basis of identification information sent from a receiver.

Specifically, a transmitter can attach identification information to the signal light by transmitting optical pulses of the signal light in a certain channel in such a manner that the optical pulses in the channel have a level which distinguishes the optical pulses in the channel from the optical pulses of the signal light in the other channels. For example, the levels of the optical pulses in the channel ch1 may be set higher than the levels of the optical pulses of the signal light in the other channels by an amount which distinguishes the optical pulses in the channel from the optical pulses of the signal light in the other channels. Thereafter, when a clock signal for determining the timings of optical control pulses is generated on the receiver side (i.e., by the optical switch device 10), the amount of delay for the channel ch1 is varied within a range corresponding to the channel period ta. At this time, it is possible to determine the amount of delay DL1 for the channel ch1 by detecting the amount of delay which maximizes the monitored optical output level within the range (channel period). That is, it is possible to identify optical pulses of the signal light in the channel ch1 from among time-division multiplexed optical pulses of the signal light in the plurality of channels.

When the amount of delay DL1 for the channel ch1 is identified, it is possible to generate the clock signal ck1 in synchronization with the timings of the channel ch1, identify the other channels on the basis of the channel period ta and the channel gap tb, and generate optical control pulses for the other channels.

Alternatively, the transmitter can attach identification information to the signal light by stopping transmission of optical pulses of the signal light in only a predetermined channel, instead of making the levels of the optical pulses of the signal light in a predetermined channel sufficiently higher than the levels of the optical pulses of the signal light in the other channels. In this case, the control-light setting unit 15 generates a clock signal for each of the other channels (in which transmission of optical pulses is not stopped) for synchronization of optical control pulses with the optical pulses of the signal light in each channel. Thus, the control-light setting unit 15 can detect the timing of the channel in which transmission of optical pulses is stopped, and identify the channel in which transmission of optical pulses is stopped (since the control-light setting unit 15 is informed, in advance, of the identification number of the channel in which transmission of optical pulses is stopped). Thereafter, the transmitter stops transmission of optical pulses of the signal light in each of the other channels in succession, and the control-light setting unit 15 performs similar operations for identifying each channel.

On the other hand, the optical switch device (the control-light setting unit 15) can identify each channel on the basis of identification information sent from a receiver as follows.

Specifically, the control-light setting unit 15 generates clock signals for optical control pulses. Thereafter, the control-light setting unit 15 inputs into the HNLF 11 optical control pulses for a predetermined channel, or stops input, into the HNLF 11, of optical control pulses for a predetermined channel. In this case, the control-light setting unit 15 can recognize a receiver station corresponding to the predetermined channel, and identify the predetermined channel on the basis of identification information which indicates the receiver station. For example, the optical switch device 10 outputs optical control pulses for only one channel. At this time, a receiver station to which the optical pulses of the signal light corresponding to the optical control pulses are outputted and which has identification information (e.g., an identification number "#4") sends to the controller 15c the identification information or information indicating whether or not the optical pulses are normally received by the receiver station. Thus, when the control-light setting unit 15 receives the identification number "#4," the control-light setting unit 15 can recognize that the channel for which the optical control pulses are inputted into the HNLF 11 is the channel ch4.

Advantages of the Invention

As explained above, the optical switch device 10 according to the present invention utilizes a nonlinear optical effect, and can perform optical switching in which the output levels of time-division multiplexed optical pulses are adaptively controlled.

In addition, it is possible to realize high-speed optical relay transmission by providing the optical switch device 10 according to the present invention in a relay node in an optical communication network. Further, since the output levels of the optical switch device according to the present invention can be variably controlled, use of the optical switch device according to the present invention enables construction of ultrafast optical communication networks. Furthermore, use of the optical switch device according to the present invention is not limited to the optical communication devices on networks, and the optical switch device according to the present invention can be widely used in various fields including the field of optical measurement.

In the optical switch device 10 according to the present invention, the levels of optical pulses outputted from the optical switch device are monitored, the monitored levels are compared with a target level, a difference between each of the monitored levels and the target level is calculated, and optical control pulses having an excitation level are generated so as to bring the difference close to zero, and cause polarization rotation and parametric amplification of one or more optical pulses to be switched, in a nonlinear optical fiber. Therefore, the optical switch device according to the present invention can perform optical switching in which the switch-output levels of time-division multiplexed optical pulses are adaptively controlled. That is, the optical switch device according to the present invention can realize high quality, flexible optical switching.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical switch device for switching optical signals, comprising:

a nonlinear optical fiber which exhibits a nonlinear optical effect, and receives signal light having a first wavelength and being constituted by optical pulses time-division multiplexed in a plurality of channels;

a first polarization controller which controls a polarization direction of said signal light;

a polarizer which is arranged on an output side of said nonlinear optical fiber, and has a major polarization axis perpendicular to said polarization direction of the signal light controlled by said first polarization controller;

a level monitoring unit which monitors levels of said optical pulses when the optical pulses are outputted from said polarizer, compares each of the monitored levels with a target level, and calculates a difference of said each of the monitored levels from the target level; and a control-light setting unit which includes a control-light generation unit and a second polarization controller, and causes polarization rotation and parametric amplification in said nonlinear optical fiber so as to realize optical switching of said optical pulses and control said levels of said optical pulses at one or more desired levels when the optical pulses are outputted from said polarizer, by using the control-light generation unit and the second polarization controller and inputting one of optical control pulses into said nonlinear optical fiber in phase with each of said optical pulses when said each of the optical pulses is to be outputted from said optical switch device, in such a manner that the one of said optical control pulses has a polarization direction forming a predetermined angle with said polarization direction of said signal light controlled by said first polarization controller, where said control-light generation unit generates said optical control pulses, the optical control pulses have a second wavelength different from said first wavelength, and excitation levels which are variably set so as to bring said difference close to zero, and said second polarization controller sets polarization directions of said optical control pulses so as to form said predetermined angle with the polarization direction of the signal light controlled by the first polarization controller.

2. The optical switch device according to claim 1, wherein said control-light setting unit variably sets said excitation levels for each of said plurality of channels within a range of power necessary for causing parametric amplification in said nonlinear optical fiber.

3. The optical switch device according to claim 2, wherein said control-light setting unit sets said excitation levels for said plurality of channels at identical levels.

4. The optical switch device according to claim 2, wherein said control-light setting unit sets said excitation levels at a different level for each of said plurality of channels.

5. The optical switch device according to claim 1, wherein, in operations for setting said excitation levels for said plurality of channels in succession, said level monitoring unit monitors a level of an optical pulse of the signal light in each of one or more of said plurality of channels for which an excitation level is to be set, when the optical pulse is outputted from said polarizer, and calculates a difference of the monitored level of the optical pulse from a predetermined target level, said control-light setting unit sets said excitation level for each of said one or more of the plurality of channels while keeping levels of optical control pulses for channels other than said one or more of the plurality of channels at zero so as to stop operation in the channels other than said one or more of the plurality of channels, and said excitation level for said each of the one or more of the plurality of channels is such that when an optical control pulse having the excitation level is inputted into the nonlinear optical fiber in phase with said optical pulse of the signal light in said each of the one or more of the plurality of channels, said difference of the monitored level of the optical pulse from said predetermined target level is close to zero, and the optical pulse is controlled at a desired level when the optical pulse is outputted from the optical switch device.

6. The optical switch device according to claim 1, wherein, in operations for setting said excitation levels for said plurality of channels in succession, said level monitoring unit monitors a sum of a first level of a first optical pulse of the signal light in each of said plurality of channels for which an excitation level is to be set and one or more second levels of one or more second optical pulses of the signal light in one or more of said plurality of channels for which one or more excitation levels are already set, when the first optical pulse and the one or more second optical pulses are outputted from said polarizer, said control-light setting unit sets said excitation level for said each of the plurality of channels while keeping optical control pulses for said one or more of said plurality of channels active so as to maintain the one or more of said plurality of channels in operation, and said excitation level for said each of the plurality of channels is such that when an optical control pulse for said each of the plurality of channels having the excitation level is inputted into the nonlinear optical fiber in phase with said first optical pulse, a difference between said sum and a target level of the sum is close to zero.

7. The optical switch device according to claim 1, wherein, in operations for setting said excitation levels, said control-light setting unit generates intensity-modulated optical control pulses by superimposing a low-frequency signal on said optical control pulses, and inputs the intensity-modulated optical control pulses into said nonlinear optical fiber, said level monitoring unit extracts the low-frequency signal from the intensity-modulated optical control pulses after the intensity-modulated optical control pulses are parametrically amplified and outputted through the polarizer, monitors an amplitude of the extracted low-frequency signal, and calculates a difference between the amplitude of the extracted low-frequency signal and a target amplitude, and said control-light setting unit corrects said excitation levels of said optical control pulses so that said difference between the amplitude of the extracted low-frequency signal and the target amplitude approaches zero and the optical pulses are controlled at said one or more desired levels when the optical pulses are outputted from the optical switch device.

8. The optical switch device according to claim 1, wherein, in operations for setting said excitation levels, said control-light setting unit variably sets said predetermined angle as well as the excitation levels so that said difference approaches zero and said optical pulses are controlled at said one or more desired levels when the optical pulses are outputted from the optical switch device.

9. The optical switch device according to claim 1, wherein, in the case where no clock information is extracted from said signal light, said control-light setting unit generates a clock signal on the basis of at least one of a channel period and a channel gap which are externally supplied to the control-light setting unit, inputs optical control pulses synchronizing with the clock signal into said nonlinear optical fiber while a phase of the clock signal is varied and a level of an optical pulse of the signal light outputted through the polarizer is monitored by said level monitoring unit, and synchronizes said optical control pulses with said optical pulses by fixing the phase of the clock signal when said level reaches a predetermined level.

10. The optical switch device according to claim 1, wherein said signal light received by said nonlinear optical fiber includes in a predetermined channel an optical pulse being arranged for channel identification and having a level which is so different from levels of more than one optical pulse of the signal light in channels other than the predetermined channel that the predetermined channel is distinguishable from the channels other than the predetermined channel, and said control-light setting unit determines which one of the optical pulses time-division multiplexed in the plurality of channels belongs to the predetermined channel, on the basis of a monitoring result of the optical pulse arranged for channel identification which is obtained by the level monitoring unit after the optical control pulses are synchronized with the optical pulses.

11. The optical switch device according to claim 1, wherein after said control-light setting unit establishes synchronization of the optical control pulses with the optical pulses, the control-light setting unit inputs into said nonlinear optical fiber an optical control pulse for only a predetermined channel, determines a receiver station which receives an optical pulse outputted from said optical switch device in correspondence with the optical control pulse, and determines one of the optical pulses time-division multiplexed in the plurality of channels which belongs to the predetermined channel, on the basis of identification numbers of receiver stations including said receiver station.

12. The optical switch device according to claim 1, wherein after said control-light setting unit establishes synchronization of the optical control pulses with the optical pulses, the control-light setting unit inputs into said nonlinear optical fiber more than one optical control pulse for ones of the plurality of channels other than a predetermined channel, determines ones of receiver stations which receive more than one optical pulse outputted from said optical switch device in correspondence with the more than one optical control pulse, and determines one of the optical pulses time-division multiplexed in the plurality of channels which belongs to the predetermined channel, on the basis of identification numbers of the receiver stations.

13. The optical switch device according to claim 1, wherein said level monitoring unit averagely monitors levels of more than one optical pulse of the signal light in each of the plurality of channels which is outputted through the polarizer after optical switching using the nonlinear optical effect.

14. An optical switching method for switching optical signals, comprising the steps of:
   (a) controlling a polarization direction of signal light having a first wavelength and being constituted by optical pulses time-division multiplexed in a plurality of channels;
   (b) inputting said signal light into a nonlinear optical fiber which exhibits a nonlinear optical effect;
   (c) generating optical control pulses having a second wavelength different from said first wavelength, and excitation levels which are variably set;
   (d) setting polarization directions of said optical control pulses so as to form a predetermined angle with the polarization direction of the signal light controlled in said step (a);
   (e) inputting one of said optical control pulses into said nonlinear optical fiber in phase with each of said optical pulses when said each of the optical pulses is to be outputted from said optical switch device, so that the one of said optical control pulses has a polarization direction forming said predetermined angle with said polarization direction of said signal light controlled in said step (a), and the one of said optical control pulses causes polarization rotation and parametric amplification of said each of the optical pulses in said nonlinear optical fiber;
   (f) filtering said optical pulses after the optical pulses are outputted from the nonlinear optical fiber, with a polarizer having a major polarization axis perpendicular to said polarization direction of the signal light controlled in said step (a) pass through the polarizer;
   (g) monitoring levels of said optical pulses when the optical pulses are outputted through said polarizer, comparing each of the monitored levels with a target level, and calculating a difference of said each of the monitored levels from the target level; and
   (h) setting said excitation levels so as to bring said difference close to zero, and control said levels of said optical pulses at one or more desired levels when the optical pulses are outputted from said polarizer.

* * * * *